(12) United States Patent
Nobori et al.

(10) Patent No.: US 7,110,021 B2
(45) Date of Patent: Sep. 19, 2006

(54) VEHICLE SURROUNDINGS MONITORING DEVICE, AND IMAGE PRODUCTION METHOD/PROGRAM

(75) Inventors: Kunio Nobori, Kadoma (JP); Masamichi Nakagawa, Hirakata (JP); Satoshi Sato, Neyagawa (JP); Mikiya Nakata, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/447,523

(22) Filed: May 29, 2003

(65) Prior Publication Data

US 2003/0222983 A1    Dec. 4, 2003

(30) Foreign Application Priority Data

May 31, 2002    (JP)    ............................. 2002-159085

(51) Int. Cl.
H04N 7/18    (2006.01)
H04N 9/47    (2006.01)

(52) U.S. Cl. ...................................... 348/148; 348/135

(58) Field of Classification Search ................ 348/143, 348/148, 45, 51, 52, 53, 54, 55, 56, 57, 58, 348/59, 60; 701/301, 211, 200; 340/937
See application file for complete search history.

(56) References Cited

U.S. PATENT DOCUMENTS

| | | | |
|---|---|---|---|
| 5,765,116 A * | 6/1998 | Wilson-Jones et al. ....... | 701/41 |
| 6,411,867 B1 * | 6/2002 | Sakiyama et al. ............. | 701/1 |
| 6,483,429 B1 * | 11/2002 | Yasui et al. .................. | 340/435 |
| 6,515,597 B1 * | 2/2003 | Wada et al. .................. | 340/988 |
| 2002/0005779 A1 * | 1/2002 | Ishii et al. ................... | 340/436 |
| 2002/0034316 A1 * | 3/2002 | Ishii et al. ................... | 382/104 |
| 2002/0039136 A1 * | 4/2002 | Okamoto et al. ........... | 348/148 |
| 2002/0113876 A1 * | 8/2002 | Kim ............................ | 348/148 |
| 2002/0175999 A1 * | 11/2002 | Mutobe et al. ............. | 348/148 |
| 2002/0191078 A1 * | 12/2002 | Okamoto et al. ........... | 348/148 |

FOREIGN PATENT DOCUMENTS

| | | |
|---|---|---|
| EP | 1 150 252 A2 | 10/2001 |
| EP | 1 157 890 A1 | 11/2001 |
| EP | 1 170 697 A2 | 1/2002 |
| JP | 58110334 | 6/1983 |
| JP | 03099952 A | 4/1991 |
| JP | 06333200 A | 12/1994 |
| JP | 08261719 A | 10/1996 |

(Continued)

OTHER PUBLICATIONS

European Search Report for European Patent Application No. 03012543; Mailed on Dec. 18, 2003.

*Primary Examiner*—Mehrdad Dastouri
*Assistant Examiner*—Dave Czekaj
(74) *Attorney, Agent, or Firm*—Harness, Dickey & Pierce, P.L.C.

(57) ABSTRACT

A synthesized image showing the situation around a vehicle is produced from images taken with cameras capturing the surroundings of the vehicle and presented to a display. A position computation section computes position information and the reliability of the position information, for a plurality of points in the camera images. An image variable-synthesis section produces a first synthesized image from the camera images using the position information. An image fixed-synthesis section produces a second synthesized image by road surface projection, for example, without use of the position information. A synthesis scheme selection section selects either one of the first and second synthesized images according to the reliability as the synthesized image to be presented.

15 Claims, 17 Drawing Sheets

FOREIGN PATENT DOCUMENTS

| | | |
|---|---|---|
| JP | 09322040 A | 12/1997 |
| JP | 10020839 | 1/1998 |
| JP | 2000228748 A | 8/2000 |
| JP | 2001169308 A | 6/2001 |
| JP | 2001315603 | 11/2001 |

* cited by examiner

Image taken with camera 1

Image taken with camera 2

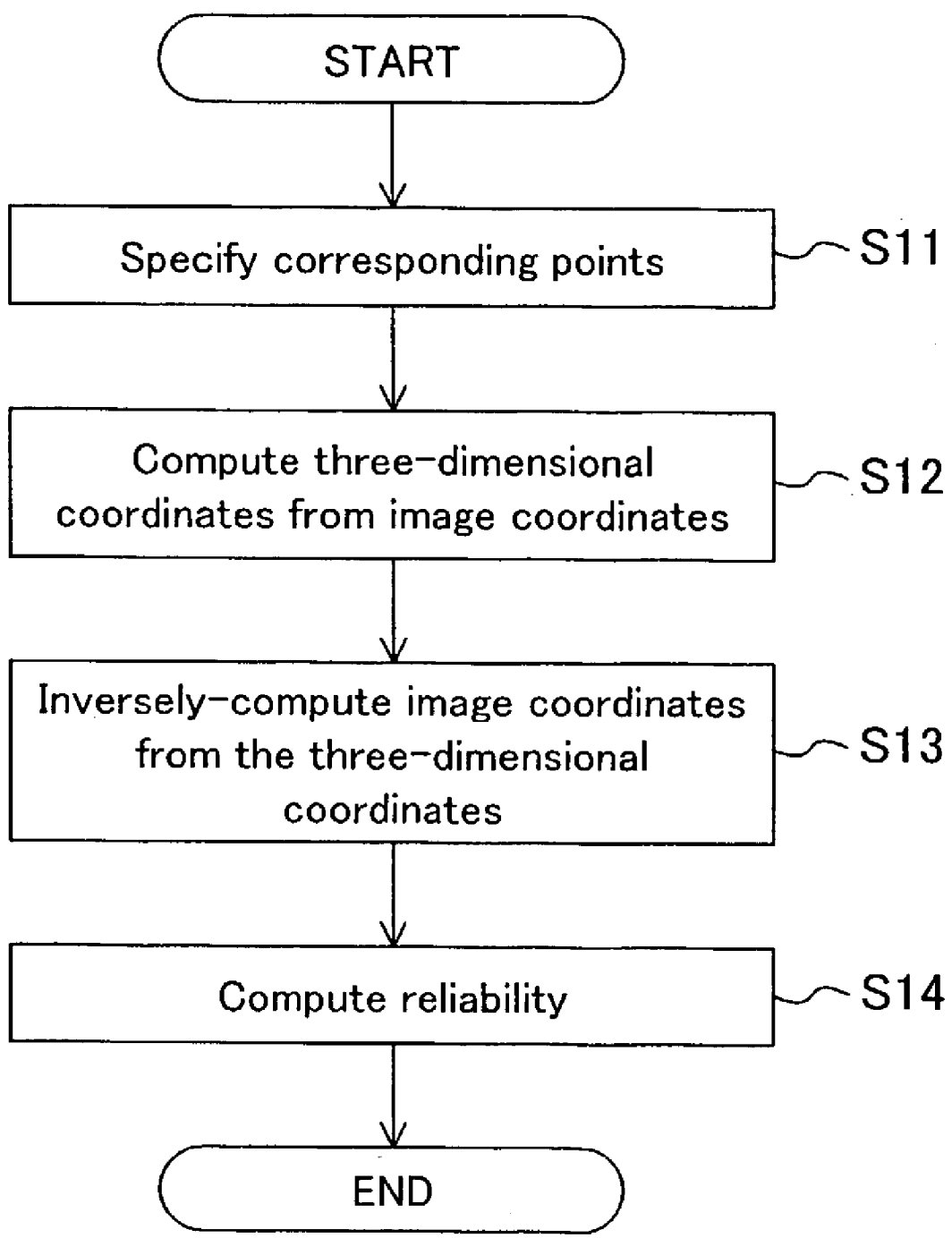

When the reliability is high

When the reliability is low

When no obstacle is detected

Image taken with camera 1

Image taken with camera 2

When the vehicle moves backward to the left

When the vehicle moves backward to the right

VEHICLE SURROUNDINGS MONITORING DEVICE, AND IMAGE PRODUCTION METHOD/PROGRAM

BACKGROUND OF THE INVENTION

The present invention relates to a technology on a vehicle surroundings monitoring device in which images taken with a camera capturing the surroundings of a vehicle are transformed to provide a synthesized image showing the situation around the vehicle.

In recent years, to help drivers drive safely, vehicle surroundings monitoring devices for monitoring the surroundings of a vehicle with a camera have been increasingly put into practical use.

In one type of conventional vehicle surroundings monitoring device, a camera is placed so as to capture a blind spot for the driver, such as an area behind the vehicle. Image taken with the camera are transformed by a predetermined fixed method, to be displayed on a display. For example, in a technique disclosed in Japanese Laid-Open Patent Publication No. 03-99952 (literature 1), a plurality of cameras are placed on a car as shown in FIG. 20A. Images of the surroundings of the car taken with the cameras are transformed, to produce an image viewed from top with the car in the center as shown in FIG. 20B, and the resultant image is presented to a display mounted in the car.

In another type, the position of an obstacle in an image taken with a camera placed on a vehicle is computed. The image is transformed according to the computed position of the obstacle, to be displayed on a display. For example, in a technique disclosed in Japanese Laid-Open Patent Publication No. 06-333200 (literature 2), the position of an obstacle in an image is computed using two images taken at slightly different times when the vehicle is moving. The images are transformed using the computed position of the obstacle, to obtain a synthesized image viewed from side as shown in FIG. 21A.

By use of the monitoring devices described above, the driver can check a blind spot, of which direct observation is not possible from the driver's seat, with a display, and can easily grasp how the obstacle is apart from the vehicle with an image viewed from top or side. In this way, the driver can drive more safely.

However, the conventional techniques described above have the following problems.

In the case of transformation of a camera image by a predetermined fixed method, no consideration is given to the shape of an obstacle in the image. Therefore, the shape of the obstacle is distorted in a synthesized image, and this makes the synthesized image unnatural. For example, in the literature 1, a camera image is transformed on the assumption that any object in the image exists in the same plane, that is, in the plane of road surface, for example. Therefore, as shown in FIG. 20B, while the road surface is displayed correctly, an object that is not in the plane of road surface, such as an obstacle, is displayed as a distorted unnatural image.

In the case of transformation of an image according to the position of an obstacle computed from images, a natural synthesized image with no distortion is produced when the position of the obstacle is correctly computed. However, if the computed position includes errors greatly, the obstacle may possibly be displayed at a wrong position, or the obstacle may not be displayed in a synthesized image. For example, in the literature 2, the position of an obstacle is computed by extracting the motion of a luminance edge from two images taken at slightly different times. In the actual drive environment, however, there often occur such cases that the computed position includes errors greatly and that the position of an obstacle is undetectable at all. In the case that the computed position includes errors greatly, the obstacle may be displayed at a position farther than the actual position, or the obstacle may not be shown in the synthesized image. This may mislead the driver and thus prevent the driver from driving safely.

SUMMARY OF THE INVENTION

An object of the present invention is providing a technology that enables presentation of an image showing the situation around a vehicle more naturally in a manner not to mislead the driver than conventionally achieved.

According to the present invention, position information and the reliability indicating how precisely the position information has been computed are computed for a plurality of points in camera images. Based on this reliability, an image synthesis scheme to be adopted is selected as appropriate, for the entire image or partially, between an image synthesis scheme in which the camera images are transformed using the position information and an image synthesis scheme in which the camera images are transformed by a predetermined method without use of the position information. By this selection, if the reliability is high indicating that the position information has been computed correctly, a synthesized image with little distortion produced using the position information is displayed. Contrarily, if the reliability is low indicating that the position information includes errors greatly, a synthesized image, produced without use of the position information but free from the problems that an obstacle is positioned at a wrong position and that an obstacle disappears, is displayed. Therefore, it is possible to present an image showing the situation around a vehicle more naturally in a manner not to mislead the driver than conventionally achieved.

Specifically, the vehicle surroundings monitoring device of the present invention is a device for producing a synthesized image showing the situation around a vehicle from images taken with a camera capturing the surroundings of the vehicle and presenting the synthesized image, including: a position computation section for computing position information and reliability of the position information, for a plurality of points in the camera images; an image variable-synthesis section for producing a first synthesized image from the camera images using the position information; an image fixed-synthesis section for producing a second synthesized image from the camera images by a predetermined method without use of the position information; and a synthesis scheme selection section for selecting either one of the first and second synthesized images according to the reliability as the synthesized image to be presented.

In the vehicle surroundings monitoring device of the present invention, the synthesis scheme selection section may select image parts from the first and second synthesized images according to the reliability, in place of selecting either one of the first and second synthesized images, and produce the synthesized image to be presented from the selected image parts.

The image production method of the present invention is a method for producing a synthesized image showing the situation around a vehicle from images taken with a camera capturing the surroundings of the vehicle, including the steps of: (1) computing position information and the reliability of the position information, for a plurality of points in the camera images; (2) comparing the reliability computed in the step (1) with a predetermined reference; (3) producing the synthesized image from the camera images using the position information computed in the step (1) if the reliability is determined higher than the predetermined reference in the step (2); and (4) producing the synthesized image from the camera images by a predetermined method without use of the position information if the reliability is determined lower than the predetermined reference in the step (2).

According to another aspect of the invention, a program enabling a computer to execute the image production method of the present invention is provided.

BRIEF DESCRIPTION OF THE DRAWINGS

FIG. 3 is a flowchart of the operation of a position computation section.

DESCRIPTION OF THE PREFERRED EMBODIMENTS

Hereinafter, preferred embodiments of the present invention will be described with reference to the accompanying drawings.

(Embodiment 1)

Figure 1:
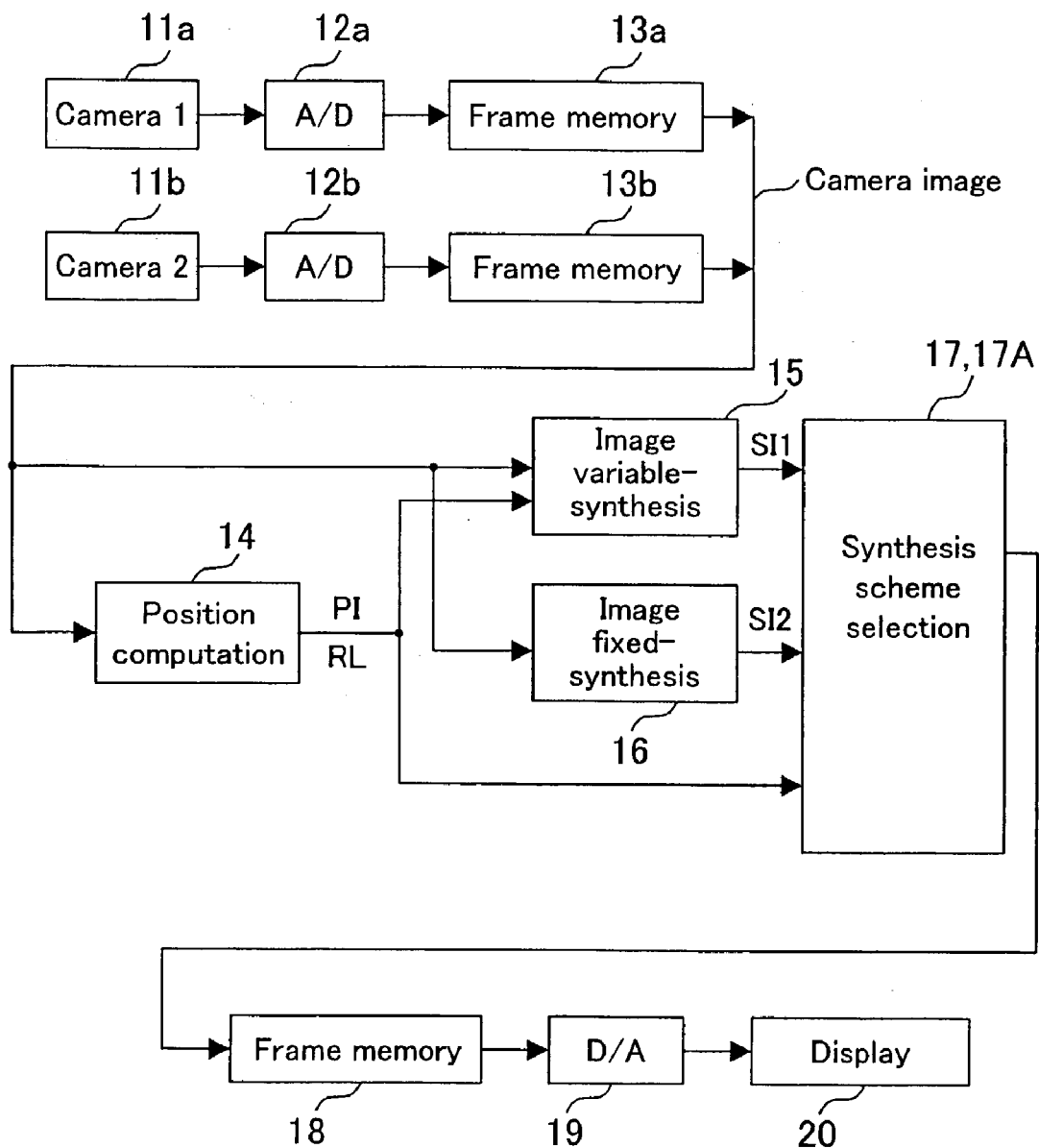
FIG. 1 is a block diagram showing a configuration of vehicle surroundings monitoring devices of Embodiments 1 and 2 of the present invention.

FIG. 1 is a block diagram of a vehicle surroundings monitoring device of Embodiment 1 of the present invention. The vehicle surroundings monitoring device of FIG. 1 produces a synthesized image showing the situation around a vehicle from images taken with cameras capturing the surroundings of the vehicle, and presents the synthesized image to a display.

Referring to FIG. 1, the vehicle surroundings monitoring device includes: cameras $11a$ and $11b$ for capturing the surroundings of a vehicle; A/D converters $12a$ and $12b$ for digitizing an analog video signal obtained from the cameras $11a$ and $11b$; and frame memories $13a$ and $13b$ for temporarily holding the digitized camera images. The device also includes: a position computation section 14 for computing position information PI and the reliability RL of the position information PI, for a plurality of points in camera images; an image variable-synthesis section 15 for transforming the camera images using the position information PI to produce a first synthesized image SI1 viewed from a different perspective; an image fixed-synthesis section 16 for transforming the camera images by a predetermined method without use of the position information PI to produce a second synthesized image SI2 viewed from a different perspective; and a synthesis scheme selection section 17 for selecting either one of the first and second synthesized images SI1 and SI2 according to the reliability RL as the synthesized image to be presented. The device further includes: a frame memory 18 for temporarily holding the synthesized image to be presented; a D/A converter 19 for converting the digital image data held in the frame memory 18 to an analog video signal; and a display 20 for displaying the analog video signal.

Figure 2A:
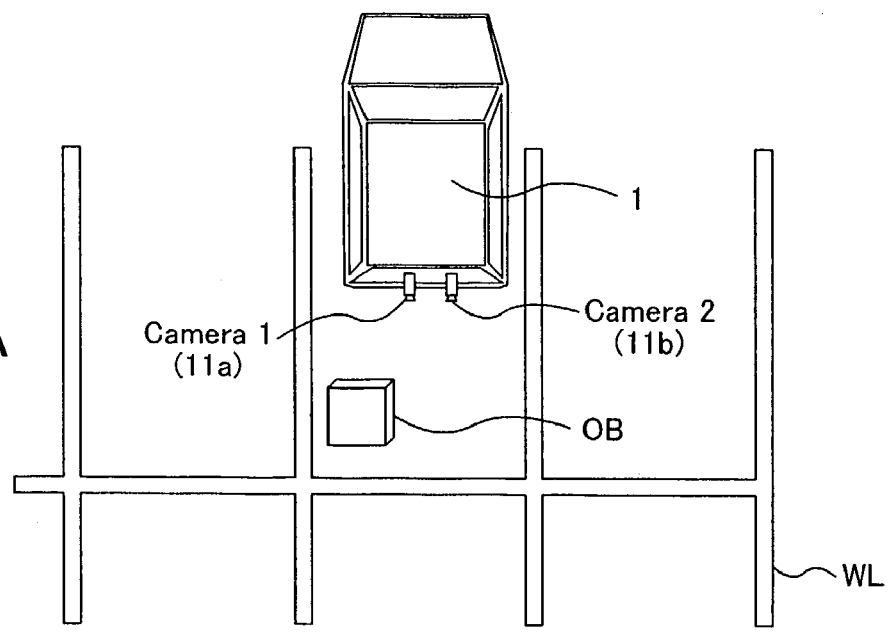
FIG. 2A illustrates an example of placement of cameras in Embodiment 1.
Figure 2B:
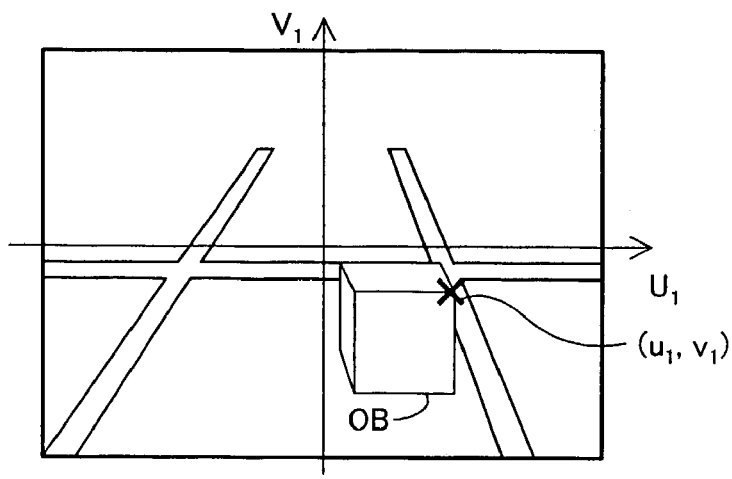
FIGS. 2B and 2C are examples of camera images taken in the situation shown in FIG. 2A.
Figure 2C:
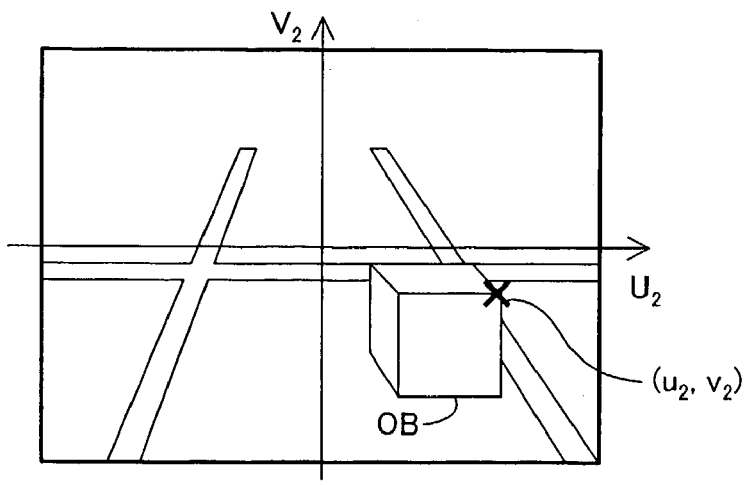

FIG. 2A shows an example of placement of cameras in this embodiment, and FIGS. 2B and 2C are examples of camera images. As shown in FIG. 2A, in this embodiment, two cameras (camera 1 and camera 2, corresponding to the cameras $11a$ and $11b$ in FIG. 1) are placed on the rear of a vehicle 1 so as to capture the scene behind the vehicle. In FIG. 2A, OB denotes an obstacle and WL denotes white lines. FIGS. 2B and 2C are examples of camera images taken with the camera 1 and the camera 2, respectively. As is found from FIGS. 2B and 2C, the coverage of the camera 1 overlaps the coverage of the camera 2. According to the present invention, the cameras may also be placed somewhere other than on the vehicle, such as in a parking lot and on a facility along a road. It is assumed that the display 20 is placed at a position in the vehicle 1 permitting easy view by the driver. Naturally, the display 20 may be placed somewhere other than in the vehicle.

The position computation section 14 computes position information of each of a plurality of points in the camera images and the reliability of the position information, by using three-dimensional position detection with so-called binocular stereo. FIG. 3 is a flowchart of the operation of the position computation section 14.

The position computation section 14 reads camera image data from the frame memories 13a and 13b, specifies corresponding points from the two camera images (first and second camera images), and computes the coordinates of the corresponding points (S11).

To state more specifically, first, image data of the first camera image is sequentially read from the frame memory 13a, and the amount of change in intensity in a small region around each pixels are computed.

Next, a predetermined number of pixels (u1i, v1i) are in the computed intensity change amount are selected from all pixels from largest to smaller. By this selection in decreasing order of the intensity change amount, pixels on the boundary of an object and the like are more likely to be selected. Assume, for example, that a pixel (u1, v1) corresponding to an edge of the obstacle OB is selected.

Using small regions respectively including the selected pixels (u1i, v1i) (i=1, . . . , n) in the center as the references for comparison, small regions in the second camera image respectively smallest in the difference in intensity from the references are tracked. Then, image coordinates (u2i, v2i) (i=1, . . . , n) of the center points of the small regions obtained as the result of the tracking are computed. A point (u2, V2) in FIG. 2C is an example of these selected points, and corresponds to an edge of the obstacle OB, as does the point (u1, v1) in FIG. 2B.

The method for selecting corresponding point candidates from images and the method for detecting corresponding points between two images are described in many publications such as Jianbo Shi, Garlo Tomasi, "Good Features to Track", IEEE Conference on Computer Vision and Pattern Recognition, 1994 and Bruce D. Lucas, Takeo Kanade, "An Iterative Image Registration Technique with an application to Stereo Vision", Proceedings of Imaging Understanding Workshop, 1981, pp. 121–131, for example. Detailed description on these methods is therefore omitted here.

Thereafter, the position computation section 14 computes three-dimensional coordinates of the corresponding points specified in step S11 from the image. coordinates (u1i, v1i) and (u2i, v2i) (i=1, . . . , i) (S12). In this computation, the positional relationship between the cameras 1 and 2 (coordinate transformation matrix) M12 and respective camera parameters f1 and f2, measured in advance, are used.

Figure 4:
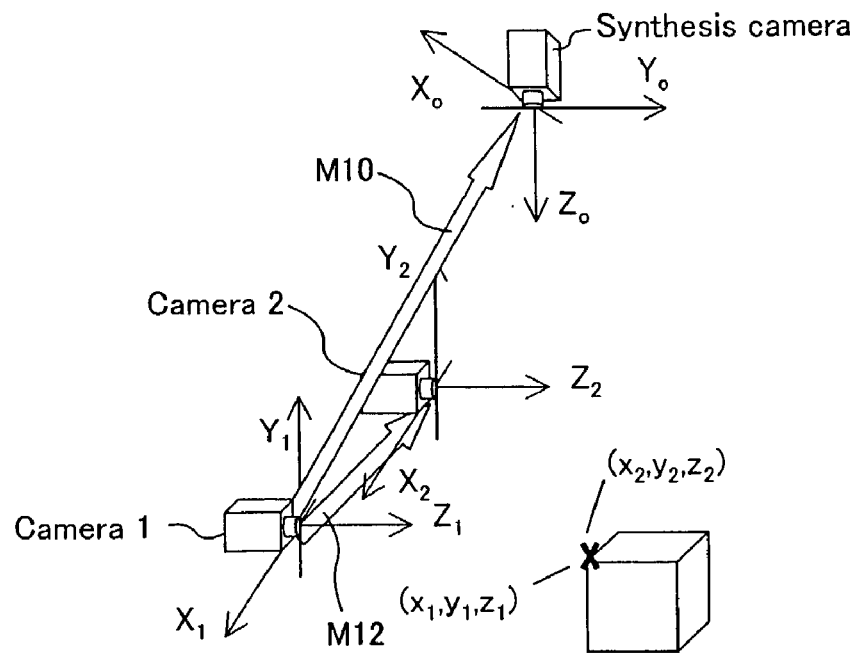
FIG. 4 is a conceptual view showing the relationship between camera coordinate systems.

Assume that the coordinate systems of the cameras 1 and 2 are arranged as shown in FIG. 4. The following relational expression is established between coordinates (x1, y1, z1) of a given point in the viewpoint coordinate system of the camera 1 and coordinates (x2, y2, z2) of this point in the viewpoint coordinate system of the camera 2 using the inter-camera positional relationship M12.

$$\begin{pmatrix} x_2 \\ y_2 \\ z_2 \\ 1 \end{pmatrix} = M_{12} \begin{pmatrix} x_1 \\ y_1 \\ z_1 \\ 1 \end{pmatrix}, \quad M_{12} = \begin{pmatrix} r_{00} & r_{01} & r_{02} & t_X \\ r_{10} & r_{11} & r_{12} & t_Y \\ r_{20} & r_{21} & r_{22} & t_Z \\ 0 & 0 & 0 & 1 \end{pmatrix} \quad \text{(Expression 1)}$$

Also, the following relational expression is established among the image coordinates (u1, v1) and (u2, v2) of a corresponding point, the coordinates (x1, y1, z1) of this point in the viewpoint coordinate system of the camera 1, the inter-camera positional relationship M12 and the camera parameters f1 and f2. The camera parameters f1 and f2 are respectively obtained by multiplying the focal distance of the camera by the transformation coefficient for the pixel size and the image coordinates.

$$u_1 = f_1 \frac{x_1}{z_1} \quad \text{(Expression 2)}$$

$$v_1 = f_1 \frac{y_1}{z_1}$$

$$u_2 = f_2 \frac{x_2}{z_2} = f_2 \frac{r_{00}x_1 + r_{01}y_1 + r_{02}z_1 + t_X}{r_{20}x_1 + r_{21}y_1 + r_{22}z_1 + t_Z}$$

$$v_2 = f_2 \frac{y_2}{z_2} = f_2 \frac{r_{10}x_1 + r_{11}y_1 + r_{12}z_1 + t_Y}{r_{20}x_1 + r_{21}y_1 + r_{22}z_1 + t_Z}$$

The three-dimensional coordinates (x1, y1, z1) of the corresponding point can be obtained by substituting the previously measured parameters M12, f1 and f2 and the computed image coordinates (u1, v1) and (u2, v2) of the corresponding point into Expression 2. Because Expression 2 includes four independent linear equations for three unknowns and the image coordinates (u1, v1) and (u2, v2) of the corresponding point computed from the images probably includes errors, the three-dimensional coordinates (x1, y1, z1) are computed by the method of least squares. This can reduce influence of the errors.

The image coordinates (u1, v1) in the first camera image, the image coordinates (u2, v2) in the second camera image, and the three-dimensional coordinates (x1, y1, z1) of a given point obtained in the manner described above, (u1, v1, u2, v2, x1, y1, z1), are correctively called position information of this point.

Further, the position computation section 14 inversely computes image coordinates (u1', v1') and (u2', v2') in the first and second camera images from the three-dimensional coordinates (x1, y1, z1) obtained by the method of least squares (S13). That is, the three-dimensional coordinates (x1, y1, z1) and the parameters M12, f1 and f2 are substituted into Expression 2 to newly obtain image coordinates in the first and second camera images.

The inversely-computed image coordinates (u1', v1') and (u2', v2') should match with the original image coordinates (u1, v1) and (u2, v2) if there is no measurement error. In general, however, there is a measurement error, and thus these values do not match with each other. In view of this, using a distance error average e between the original image coordinates (u1, v1) and (u2, v2) and the inversely-computed image coordinates (u1', v1') and (u2', v2'), the reliability r is determined by the following expression (S14).

$$r = \frac{1}{1+e} \quad \text{(Expression 3)}$$

$$e = \frac{\sqrt{(u_1'-u_1)^2 + (v_1'-v_1)^2} + \sqrt{(u_2'-u_2)^2 + (v_2'-v_2)^2}}{2}$$

The reliability r is 1 when no measurement error is included in the coordinates of the corresponding point, and is closer to 0 with increase of the measurement error. Thus, the reliability r represents the degree at which the computed position information (u1, v1, u2, v2, x1, y1, z1) of the corresponding point includes errors, and thus serves as an indicator of whether or not the position information is reliable.

By following the procedure described above, the position computation section 14 computes the position information PI (u1i, v1i, u2i, v2i, v1i, y1i, z1i where i=1 to n) and the reliability RL (ri where i=1 to n) of the position information PI for a predetermined number of corresponding points from the first and second camera images held in the frame memories 13a and 13b, and outputs the computed results.

The image variable-synthesis section 15 reads the data of the first and second camera images from the frame memories 13a and 13b, and produces a first synthesized image SI1 using the position information PI of the corresponding points computed by the position computation section 14. Herein, a synthesis camera placed as shown in FIG. 4 is assumed to perform image synthesis by texture mapping using previously given position M10 and a parameter f0 of the synthesis camera. The texture mapping, a technique of synthesizing an image viewed from an arbitrary viewpoint using image data and three-dimensional coordinates of points in an image, is widely known in the field of computer graphics. Detailed description of this technique is therefore omitted here. The technique used for the image synthesis by the image variable-synthesis section 15 is not limited to the texture mapping. Image synthesis reflecting the position information, such as a technique in which a given color and/or shape representing an obstacle is superimposed on a synthesized image at a position indicated by the position information, for example, may be adopted.

Figure 5:
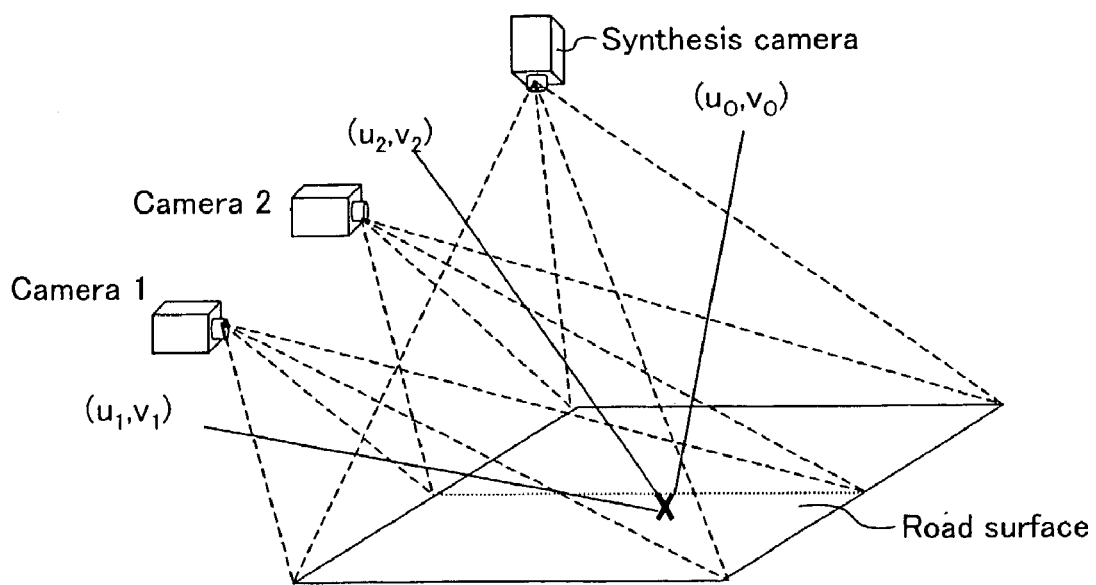
FIG. 5 is a conceptual view demonstrating image synthesis using the plane of road surface as the reference.

The image fixed-synthesis section 16 reads data of the first and second camera images from the frame memories 13a and 13b, and produces a second synthesized image SI2 by a predetermined method without use of the position information PI of the corresponding points computed by the position computation section 14. Herein, assume that image synthesis is performed using the plane of road surface as the reference as shown in FIG. 5. That is, if it is assumed that both the cameras 1 and 2 are capturing the plane of road surface, the image coordinates in the camera 1 or 2 corresponding to certain image coordinates in the synthesis camera can be computed as long as the positions of the cameras 1 and 2 and the synthesis camera with respect to the road surface and respective camera parameters are given. The image fixed-synthesis section 16 stores therein a reference table containing a value ci indicating the camera concerned and image coordinates (ui, vi) in the camera that have been computed in advance for all image coordinates (uoi, voi) in the synthesis camera. According to the reference table, the image fixed-synthesis section 16 reads image data (ci, ui, vi) corresponding to the respective coordinates (uoi, voi) in the synthesized image sequentially from the frame memories 13a and 13b, to thereby produce a synthesized image. This type of image synthesis using the plane of road surface as the reference is disclosed in International Publication No. WO 00/07373, for example. Detailed description thereof is therefore omitted here.

Figure 6A:
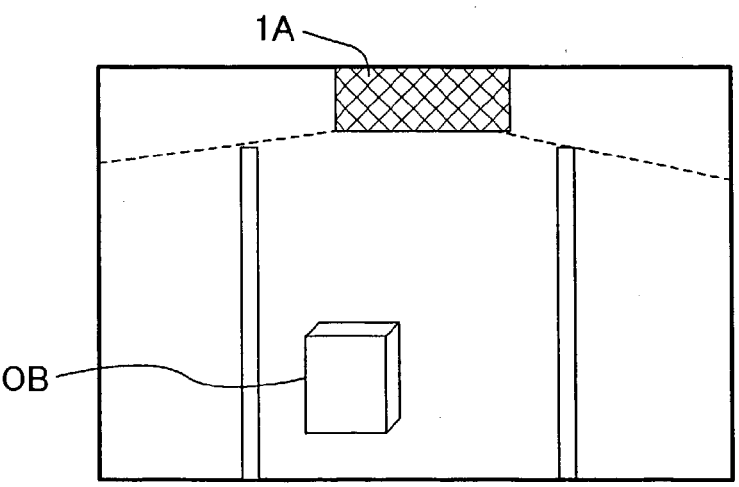
FIGS. 6A and 6B are examples of a first synthesized image produced by an image variable-synthesis section in Embodiment 1.
Figure 6B:
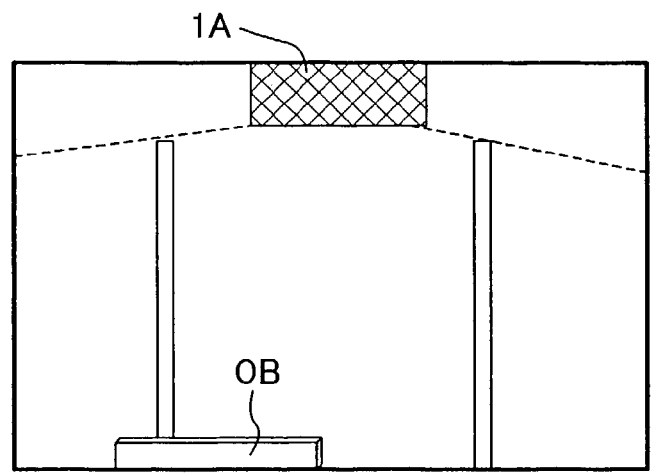

FIGS. 6A and 6B are examples of the first synthesized image SI1 produced by the image variable-synthesis section 15 in the situation shown in FIG. 2A. FIG. 6A shows the case that the position information PI of corresponding points has been computed correctly by the position computation section 14, and FIG. 6B shows the case that the position information PI includes errors greatly. In these images, 1A represents the vehicle 1. As shown in FIG. 6A, the first synthesized image SI1, obtained by changing the viewpoint while maintaining the three-dimensional position of the object in the original camera images, has a feature that the distance from the obstacle OB can be easily grasped, compared with the camera images shown in FIGS. 2B and 2C. However, as shown in FIG. 6B, the first synthesized image SI1 has another feature that the position and shape of the obstacle OB are not precise if the position information PI includes errors greatly.

Figure 7:
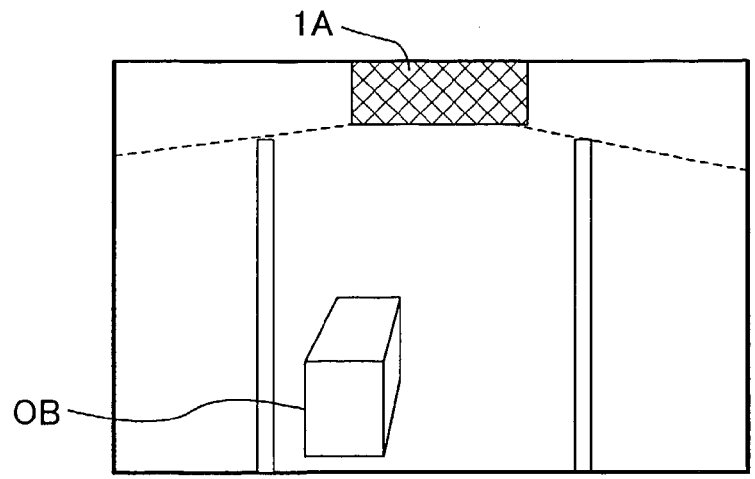
FIG. 7 is an example of a second synthesized image produced by an image fixed-synthesis section in Embodiment 1.

FIG. 7 is an example of the second synthesized image SI2 produced by the image fixed-synthesis section 16 in the situation shown in FIG. 2A. As shown in FIG. 7, in the second synthesized image SI2, the positional relationship between the vehicle and a region at which the obstacle OB contacts the road surface is precise, but a region having a height with respect to the plane of road surface is shown in a distorted, unnatural shape.

To overcome the above problems, the synthesis scheme selection section 17 selects either one of the first and second synthesized images SI1 and SI2 according to the reliability RL computed by the position computation section 14 as the synthesized image to be presented, and outputs the selected synthesized image. To state more specifically, the first synthesized image SI1 produced by the image variable-synthesis section 15 is selected when the reliability RL is determined higher than a predetermined reference, that is, when the position information PI does not include errors so greatly. Contrarily, the second synthesized image SI2 produced by the image fixed-synthesis section 16 is selected when the reliability RL is determined lower than a predetermined reference, that is, when the position information PI includes errors greatly.

The reliability RL is compared with a predetermined reference in the following manner. First, reliabilities ri of n corresponding points computed by the position computation section 14 are respectively compared with a predetermined threshold rth, and the number m of corresponding points having a reliability equal to or higher than the predetermined threshold rth is counted. The ratio m/n of the number m of corresponding points equal to or higher than the threshold rth to the total number n is compared with a predetermined threshold mth. If the ratio m/n is greater than the threshold mth, the reliability RL is determined higher than the predetermined reference, and thus the first synthesized image SI1 produced by the image variable-synthesis section 15 is selected. If the ratio m/n is smaller than the threshold mth, the reliability RL is determined lower than the predetermined reference, and thus the second synthesized image SI2 produced by the image fixed-synthesis section 16 is selected. The comparison of the reliability with the predetermined reference is not limited to the way described above. For example, the number of corresponding points having reliabilities ri higher than the threshold value rth may be compared with a threshold.

The cameras 11a and 11b take images at the respective fixed periods. The position computation section 14, the image variable-synthesis section 15, the image fixed-synthesis section 16 and the synthesis scheme selection section 17 execute the operation described above repeatedly every time a camera image is obtained. In this way, a synthesized image corresponding to the temporally changing situation around the vehicle is displayed on the display 20.

The driver takes a look at the synthesized image displayed on the display 20 and drives by referring to the synthesized image. For example, in the situation shown in FIG. 2A, the image variable-synthesis section 15 produces the synthesized image of FIG. 6A when the position information PI has been computed correctly by the position computation section 14 or the synthesized image of FIG. 6B when the position information PI has not been computed correctly, while the image fixed-synthesis section 16 produces the synthesized image of FIG. 7. The image of FIG. 6A is natural with no distortion of the obstacle OB compared with the image of FIG. 7. However, the image of FIG. 6B may cause the driver to misjudge the position of the obstacle OB with high possibility. In this case, therefore, the image of FIG. 7 is more preferable.

In view of the above, in this embodiment, the synthesis scheme selection section 17 determines whether or not the position information PI has been computed correctly using the reliability RL, selects the synthesized image of FIG. 6A produced by the image variable-synthesis section 15 when the position information PI has been computed correctly, or selects the synthesized image of FIG. 7 produced by the image fixed-synthesis section 16 when the position information PI includes errors greatly, and outputs the selected synthesized image. As a result, a natural image safer for the driver can be presented.

As described above, in this embodiment, the position computation section computes the position information of an object in an image and the reliability of the position information. The image variable-synthesis section produces the first synthesized image by transforming camera images using the position information, and the image fixed-synthesis section produces the second synthesized image by transforming camera images following a predetermined procedure without use of the position information. The first synthesized image is selected when it is determined from the reliability of the position information that the position information has been computed correctly. Contrarily, the second synthesized image is selected when it is determined that the position information has the possibility of including errors greatly. Thus, the resultant synthesized image is free from the problems that an obstacle is displayed at a wrong position and that an actually existing obstacle is not displayed. In addition, a synthesized image with little distortion can be displayed in some situations. In this way, a more natural image safer for the driver can be presented.

In this embodiment, no limitation is posed on the composition of the first and second synthesized images produced by the image variable-synthesis section 15 and the image fixed-synthesis section 16. However, the image variable-synthesis section 15 and the image fixed-synthesis section 16 should preferably synthesize images so that the first and second synthesized images match with each other in the position of the road surface. This prevents an occurrence that the resultant synthesized image is hard to look at when the image synthesis scheme is frequently switched, and thus allows the driver to easily grasp the situation around the vehicle.

For example, the reliability RL of the position information greatly changes every time the processing is repeated in some situations of taking images, causing frequent switching between the first synthesized image and the second synthesized image. In such an occurrence, if the composition is greatly different between the first and second synthesized images, the driver will find difficulty in grasping the situation around the vehicle. To solve this problem, the image variable-synthesis section 15 and the image fixed-synthesis section 16 may be set in advance to be common in the position and internal parameters of the synthesis camera in image synthesis. By this setting, it is possible to produce synthesized images with the road surface located at substantially the same position as shown in FIGS. 6A, 6B and 7. As a result, the resultant synthesized image will not be hard to look at even when it is frequently switched.

In this embodiment, the image synthesis scheme was selected according to the reliability of the position information. Alternatively, hysteresis may be given to the threshold for the selection, so that frequent switching of the image synthesis scheme can be suppressed in an event that the reliability minutely fluctuates at a rapid period, for example. Frequent switching of the image synthesis scheme can also be suppressed by imposing a restriction that the switching is made only after the lapse of a predetermined time. By this suppression, the resultant synthesized image becomes easier to look at, and thus the driver can more easily grasp the situation around the vehicle.

In this embodiment, the image synthesis scheme was selected according to the reliability of the position information. The position information itself may additionally be used for selection of the image synthesis scheme. For example, the synthesis scheme selection section 17 may extract points belonging to a region used for the image synthesis by the image variable-synthesis section 15 and the image fixed-synthesis section 16 by referring to the three-dimensional positions and image coordinates of respective corresponding points included in the position information. The reliability of the extracted points may be used for the selection of the synthesized image. Specifically, for example, if the number of extracted points is equal or more than a predetermined value, the image synthesis scheme may be selected using the reliability of the extracted points following the procedure described above. Contrarily, if the number of extracted points is less than the predetermined value, the second synthesized image SI2 produced by the image fixed-synthesis section 16 may be selected. By adopting this method, the reliability of corresponding points that do not belong to the region used for the image synthesis is no more considered in the selection of the image synthesis scheme. Thus, a more suitable synthesized image can be presented.

In this embodiment, the cameras were placed so as to capture the scene behind the vehicle and be different in horizontal position from each other as shown in FIG. 2A. The camera coverage and the camera mount position are not specifically limited. As long as the cameras are placed so that the camera coverages overlap each other, the processing described in this embodiment can be performed for the overlapping region.

In this embodiment, the reliability of the position information of a corresponding point was calculated from Expression 3 based on the image coordinates. The computation of the reliability is not limited to this, but any reference value may be used as long as it can serve as a scale indicating the magnitude of errors included in the position information of a corresponding point and the possibility of occurrence of errors.

In this embodiment, the image variable-synthesis section 15 performed image synthesis using position information of n corresponding points computed by the position computation section 14. Alternatively, position information of only points having a reliability equal to or greater than a predetermined threshold among the n corresponding points may be selected and used. This selection eliminates position information low in reliability, and thus synthesis errors can be reduced in the resultant synthesized image.

In this embodiment, a single image variable-synthesis section 15 and a single image fixed-synthesis section 16 were provided. The number of image synthesis sections is not limited to this. For example, a plurality of image variable-synthesis sections and/or a plurality of image fixed-synthesis sections may be provided, and the synthesis scheme selection section 17 may select one of synthesized images produced by these image synthesis sections according to the reliability of the position information.

In this embodiment, the position computation section 14 adopted the binocular stereo system in which images taken with two cameras simultaneously were used for computation of a position. Alternatively, a so-called motion stereo system may be adopted in which two temporally sequential camera images are used for computation of a position. In this case, also, the effect described in this embodiment is obtained.

(Embodiment 2)

A vehicle surroundings monitoring device of Embodiment 2 has the same configuration as that of Embodiment 1 shown in FIG. 1, except that a synthesis scheme selection section 17A in this embodiment superimposes on a synthesized image an indication according to a feature of the synthesized image. In addition, in this embodiment, the position information PI itself is used in combination with the reliability RL of the position information for the selection of a synthesized image.

Specifically, the synthesis scheme selection section 17A operates as follows. The synthesis scheme selection section 17A extracts points belonging to an obstacle that is likely to appear in a synthesized image from n corresponding points specified by the position computation section 14. In other words, the synthesis scheme selection section 17A extracts points that are apart from the road surface by a predetermined distance and belong to a region used for image synthesis, based on three-dimensional position coordinates and image coordinates included in the position information PI.

Figure 8A:
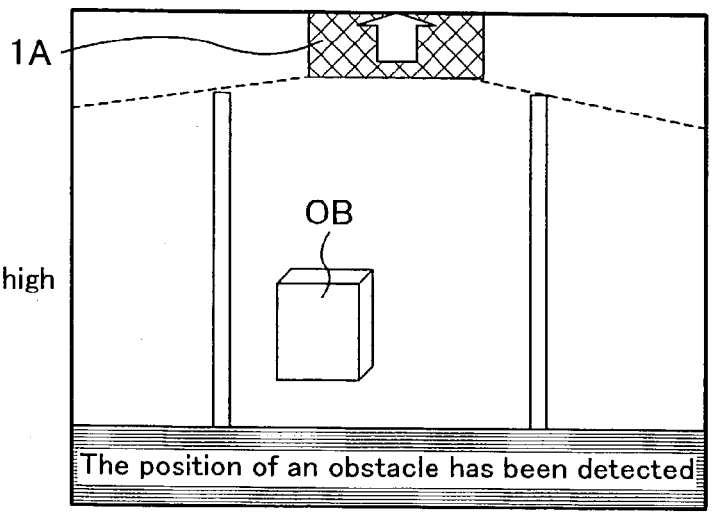
FIGS. 8A to 8C are examples of a synthesized image presented in Embodiment 2.

If the number of extracted points is equal to or more than a predetermined value, the synthesis scheme selection section 17A performs the processing described in Embodiment 1 using the reliability of the extracted points, and selects the first synthesized image SI1 produced by the image variable-synthesis section 15 if the reliability is higher than a predetermined reference. In this case, determining that the position of the obstacle OB has been detected precisely, the synthesis scheme selection section 17A superimposes a massage "The position of an obstacle has been detected", for example, on the synthesized image as shown in FIG. 8A. If the reliability is lower than the predetermined reference, the synthesis scheme selection section 17A selects the second synthesized image SI2 produced by the image fixed-synthesis section 16. In this case, determining that precise detection of the position of the obstacle OB has failed, the synthesis scheme selection section 17A superimposes a massage "Failed to compute the position; this image has distortion", for example, on the synthesized image as shown in FIG. 8B.

If the number of extracted points is less than the predetermine value, the synthesis scheme selection section 17A selects the second synthesized image SI2 produced by the image fixed-synthesis section 16. In this case, determining that no obstacle has been detected around the vehicle, the synthesis scheme selection section 17A superimposes a massage "No obstacle detected", for example, on the synthesized image as shown in FIG. 8C.

Although the shape of an obstacle is correctly shown in the first synthesized image SI1 produced by the image variable-synthesis section 15 as shown in FIG. 6A, the shape of an obstacle may be distorted in the second synthesized image SI2 produced by the image fixed-synthesis section 16 as shown in FIG. 7. When a user looks at the synthesized image as shown in FIG. 7, the user cannot judge whether the obstacle has a rectangular solid and image includes a distortion, or whether the image includes no distortion and the obstacle has a squashed rectangular solid. Thus, the user may possibly misunderstand the shape of the obstacle. For example, the driver may mistakenly judge that the obstacle shown in FIG. 7 is short enough to be overridden. This raises a problem in safety.

Figure 8B:
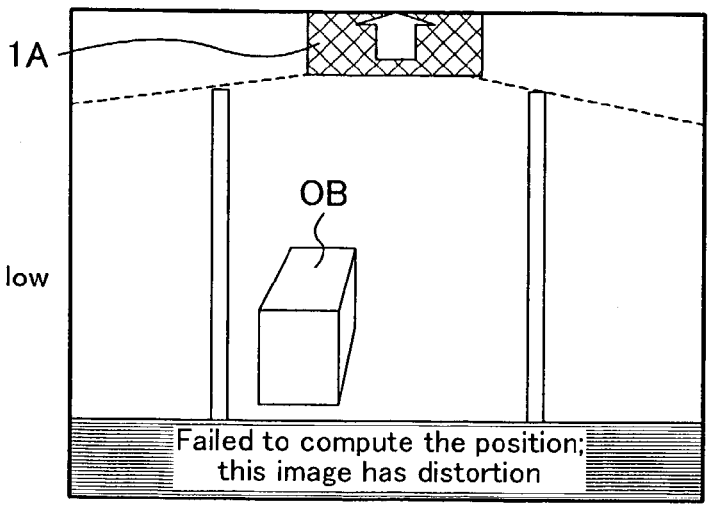
Figure 8C:
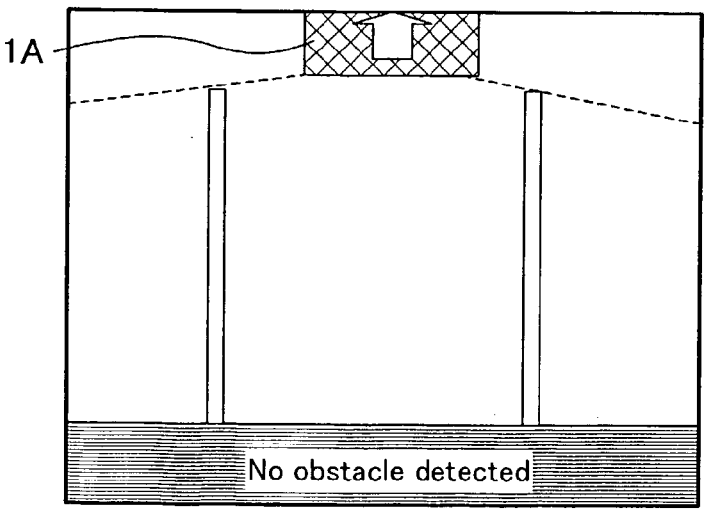

In this embodiment, as shown in FIGS. 8A to 8C, an indication according to a feature of the selected synthesized image is superimposed on the image. Therefore, the user can easily recognize that the synthesized image includes a distortion, for example. In this way, the user is prevented from misjudging the situation around the vehicle due to the nature of the synthesized image, and as a result, safer drive is realized.

(Embodiment 3)

Figure 9:
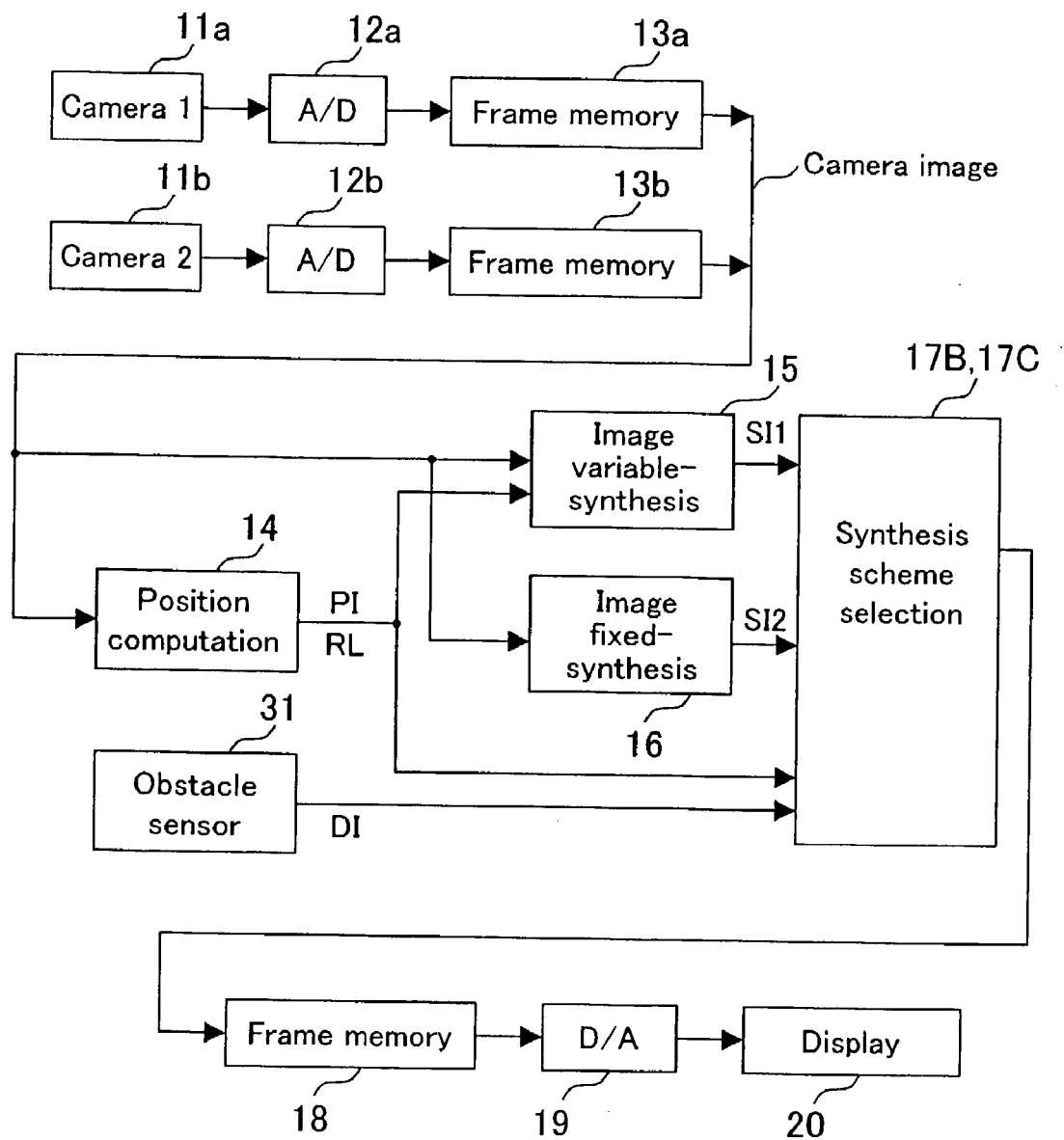
FIG. 9 is a block diagram showing a configuration of vehicle surroundings monitoring devices of Embodiments 3 and 4 of the present invention.

FIG. 9 is a block diagram of a vehicle surroundings monitoring device of Embodiment 3 of the present invention. The same components as those in FIG. 1 are denoted by the same reference numerals, and the description thereof is omitted here. The configuration of FIG. 9 is different from that of FIG. 1 in that the vehicle is provided with an obstacle sensor 31 for detecting an obstacle around the vehicle and outputting distance information DI, and that a synthesis scheme selection section 17B selects a synthesized image by additional use of the distance information DI sent from the obstacle sensor 31. The obstacle sensor 31 measures the distance from a neighboring obstacle at a fixed period, and outputs distance information DI if an obstacle exists within the range of a predetermined distance. Assume herein that the obstacle sensor 31 is an ultrasonic sensor in which the distance from an object is computed from the time required for ultrasound emitted to return after being reflected by the obstacle.

Figure 10:
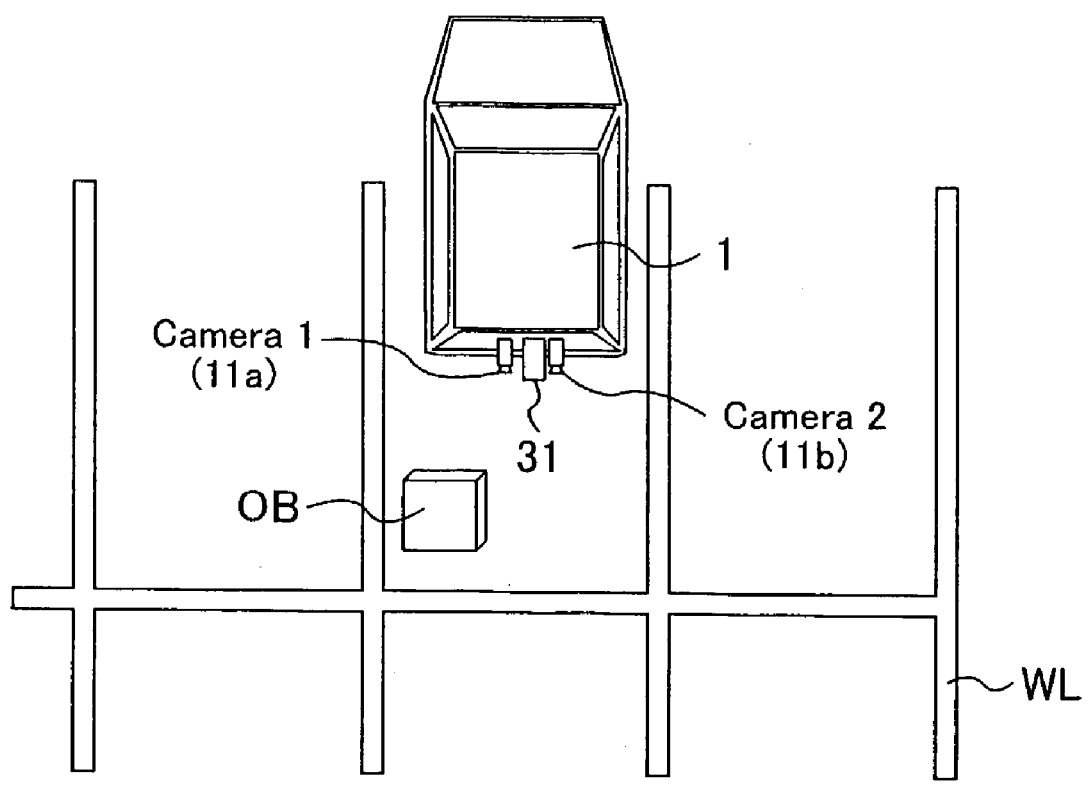
FIG. 10 illustrates an example of placement of cameras and an obstacle sensor in Embodiment 3.

FIG. 10 shows an example of placement of cameras and an obstacle sensor in this embodiment. As shown in FIG. 10, the obstacle sensor 31 is placed between the camera 1 and the camera 2. Assume that the positional relationship among the obstacle sensor 31, the camera 1 and the camera 2 has been determined in advance.

The operation of the synthesis scheme selection section 17B in this embodiment will be described. When the obstacle sensor 31 has detected no obstacle, the synthesis scheme selection section 17B compares the reliability RL of the position information with a predetermined reference and selects a synthesized image according to the comparison result, as in Embodiment 1. On the other hand, when the obstacle sensor 31 has detected an obstacle, the synthesis scheme selection section 17B first computes the distances di (i=1, . . . , n) of n corresponding points specified by the position computation section 14 from the obstacle sensor 31. This computation may be performed using the position information of the corresponding points and the positional relationship among the obstacle sensor 31, the camera 1 and the camera 2. The synthesis scheme selection section 17B then compares the computed distances di (i=1, . . . , n) with the distance information DI from the obstacle sensor 31 to obtain the differences therebetween, and determines whether or not there is a corresponding point having a difference equal to or less than a predetermined error threshold dth, that is, whether or not there is a corresponding point having a distance di substantially equal to the distance information DI. In other words, in this processing, the accuracy of the position information PI on the obstacle OB is evaluated using the distance information DI and the position information PI.

If there is a corresponding point having a distance di substantially equal to the distance information DI, the synthesis scheme selection section 17B compares the reliability RL of the position information with a predetermined reference and selects a synthesized image according to the comparison result, as in Embodiment 1. If there is no corresponding point having a distance di substantially equal to the distance information DI, that is, if it is determined that the accuracy of the position information PI on the obstacle OB is not sufficient, the synthesis scheme selection section 17B does not perform selection according to the reliability RL, but simply selects the second synthesized image produced by the image fixed-synthesis section 16.

The obstacle sensor 31 can detect an obstacle existing in a short distance comparatively reliably. In other words, when the obstacle sensor 31 outputs distance information DI, an obstacle actually exists at the position indicated by the distance information DI with high possibility. On the contrary, in the corresponding point tracking and position detection on an image, executed by the position computation section 14, the position information may include errors greatly, or a corresponding point itself on an obstacle may fail to be computed in the cases that the obstacle has a uniform luminance or color tone and that the obstacle is less distinguished from the background, in particular.

As described in Embodiment 1, the problem that the position information includes errors can be solved to some extent by selecting an image synthesis scheme based on the reliability of the position information. However, if a corresponding point itself on an obstacle fails to be computed, this failure will not be recognized from evaluation using the reliability.

In this embodiment, the synthesis scheme selection section 17B determines whether or not there is a corresponding point having a distance di substantially equal to the distance information DI. If there is no corresponding point, the position information includes errors greatly, or a corresponding point on the obstacle fails to be computed, with high possibility. In other words, it is considered that the accuracy of the position information PI computed by the position computation section 14 is not sufficient for the obstacle OB detected by the obstacle sensor 31. In such a case, the second synthesized image SI2 produced by the image fixed-synthesis section 16 is selected, to ensure display of a synthesized image including no error in the position of the obstacle.

Contrarily, if there is a corresponding point having a distance substantially equal to the distance information DI, the image synthesis scheme is selected using the reliability as in Embodiment 1. In this way, the problems that the obstacle is displayed at a wrong position and that an actually existing obstacle is not displayed are avoided. In addition, a synthesized image with little distortion can be displayed in some situations. Thus, a more natural image safer for the driver can be presented.

(Embodiment 4)

A vehicle surroundings monitoring device of Embodiment 4 has the same configuration as that of Embodiment 3 shown in FIG. 9, except that a synthesis scheme selection section 17C in this embodiment does not select either one of the first and second synthesized images SI1 and SI2 produced by the image variable-synthesis section 15 and the image fixed-synthesis section 16, but selects image parts from the first and second synthesized images SI1 and SI2 according to the reliability RL, to produce a synthesized image to be presented.

Figure 11A:
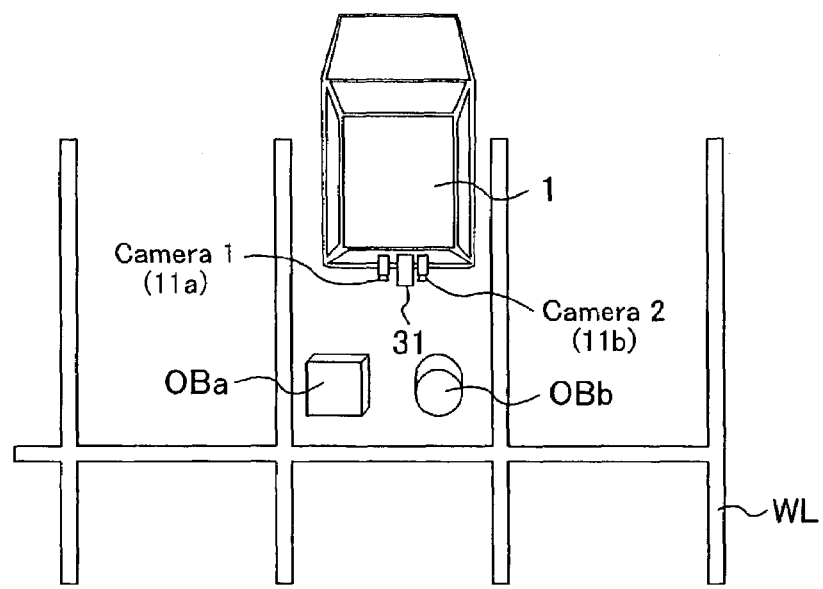
FIG. 11A illustrates an example of placement of cameras in Embodiment 4.
Figure 11B:
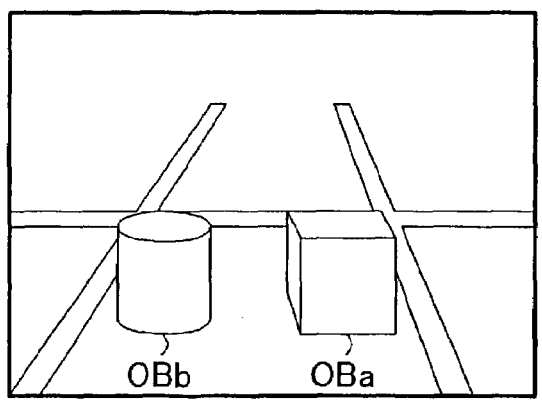
FIGS. 11B and 11C are examples of camera images taken in the situation shown in FIG. 11A.
Figure 11C:
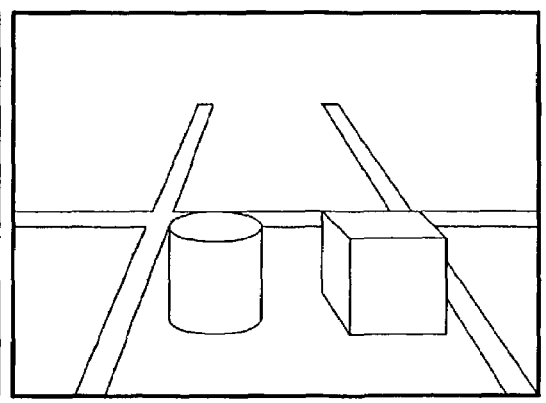

FIG. 11A shows an example of placement of cameras in this embodiment, and FIGS. 11B and 11C are examples of camera images. Assume that two obstacles OBa and OBb existing behind the vehicle 1 are captured by the cameras.

The position computation section 14 computes position information of a plurality of points in the camera images of FIGS. 11B and 11C and the reliability of the position information. In general, when a plurality of objects exist, the position information computed by the position computation section 14 in a region of an image including one object is different in the possibility of including errors and the magnitude of errors from the position information in a region including another object. Assume herein that the position information of a point in a region including the obstacle OBa is small in error, while the position information of a point in a region including the obstacle OBb is large in error. In this case, therefore, the position information of a point in a region including the obstacle OBa is high in reliability, while the position information of a point in a region including the obstacle OBb is low in reliability.

Figure 12A:
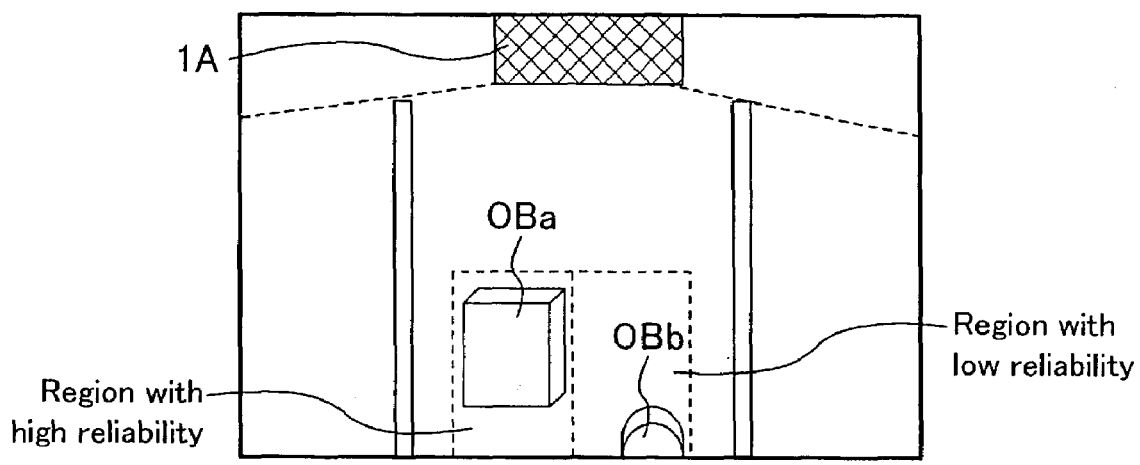
FIG. 12A is an example of a first synthesized image produced by an image variable-synthesis section.
Figure 12B:
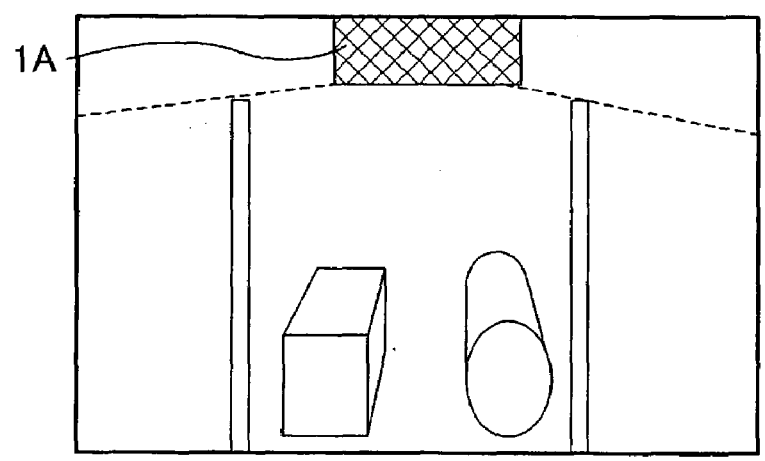
FIG. 12B is an example of a second synthesized image produced by an image fixed-synthesis section in Embodiment 4.

FIG. 12A is an example of the first synthesized image SI1 produced by the image variable-synthesis section 15, and FIG. 12B is an example of the second synthesized image SI2 produced by the image fixed-synthesis section 16. In FIG. 12A, the obstacle OBa is displayed at a correct position because the position information in the region including the obstacle OBa is high in reliability. However, the obstacle OBb is displayed at a wrong position because the position information in the region including the obstacle OBb is low in reliability and thus includes errors greatly.

Figure 13:
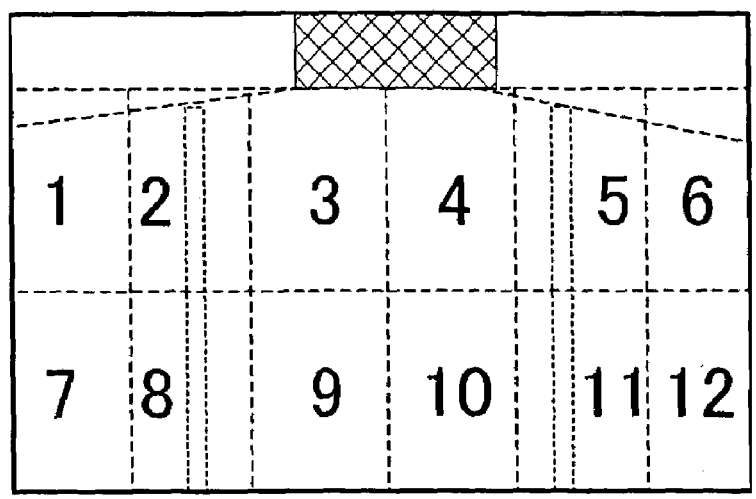
FIG. 13 illustrates an example of region division for partial selection of a synthesized image.

The synthesis scheme selection section 17C selects a synthesized image separately for a plurality of divided regions as shown in FIG. 13 (12 regions in FIG. 13). Specifically, the synthesis scheme selection section 17C computes positions of points on a synthesized image using the position information of the respective points computed by the position computation section 14 and the synthesis parameters of the image variable-synthesis section 15 and the image fixed-synthesis section 16. For each of the regions shown in FIG. 13, the synthesis scheme selection section 17C selects the first synthesized image SI1 produced by the image variable-synthesis section 15 when the reliability is equal to or higher than a predetermined threshold, or selects the second synthesized image SI2 produced by the image fixed-synthesis section 16 when the reliability is lower than the predetermined threshold.

Figure 14:
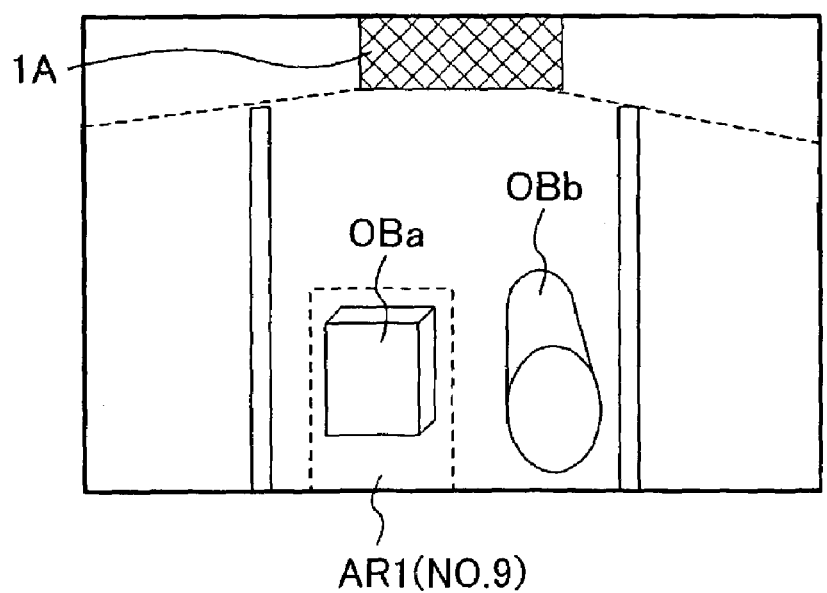
FIG. 14 is an example of a synthesized image produced by a synthesis scheme selection section in Embodiment 4.

FIG. 14 is an example of an image output from the synthesis scheme selection section 17C. As is found from FIG. 14, the first synthesized image SI1 has been selected for the region including the obstacle OBa (region 9 in FIG. 13) because the reliability of the position information is high, while the second synthesized image SI2 has been selected for the other regions. In comparison among the images of FIGS. 12A, 12B and 14, in FIG. 12A, the obstacle OBa is displayed at a correct position with little distortion but the obstacle OBb is displaced. In FIG. 12B, regions at which the obstacles OBa and OBb contact the road surface are displayed at correct positions but regions having heights with respect to the plane of the road surface are distorted. In FIG. 14, however, both the obstacles OBa and OBb are displayed nicely, that is, the obstacles OBa and OBb are at correct positions and the obstacle OBa is with little distortion, and thus a more suitable synthesized image is presented.

As described above, in this embodiment, the first and second synthesized images SI1 and SI2 are partially selected according to the reliability of position information, to produce a synthesized image. This enables display of a synthesized image that shows the positions of obstacles more correctly and has less distortion.

In this embodiment, a synthesized image was selected for each of divided regions as shown in FIG. 13. The number of regions, the locations of division, the size of the regions and the like are not limited to those described above.

The regions for partial selection of a synthesized image may not be determined in advance, but may be determined dynamically. For example, after the positions of points on a synthesized image are computed from the position information of the points and the parameters of image synthesis, the density of the points and the average of the reliability are computed for each of unit rectangular regions of a predetermined size. The first synthesized image SI1 is selected if these values are greater than predetermined thresholds, and the second synthesized image SI2 is selected if they are equal to or less than the thresholds. A region high in the density of points and reliability should be a region in which the position of an obstacle has been computed correctly. Therefore, by selecting such a region dynamically, a synthesized image with less distortion can be produced.

Naturally, the position information PI and the distance information DI may be additionally used for the image selection, as described in the above embodiment.

(Embodiment 5)

Figure 15:
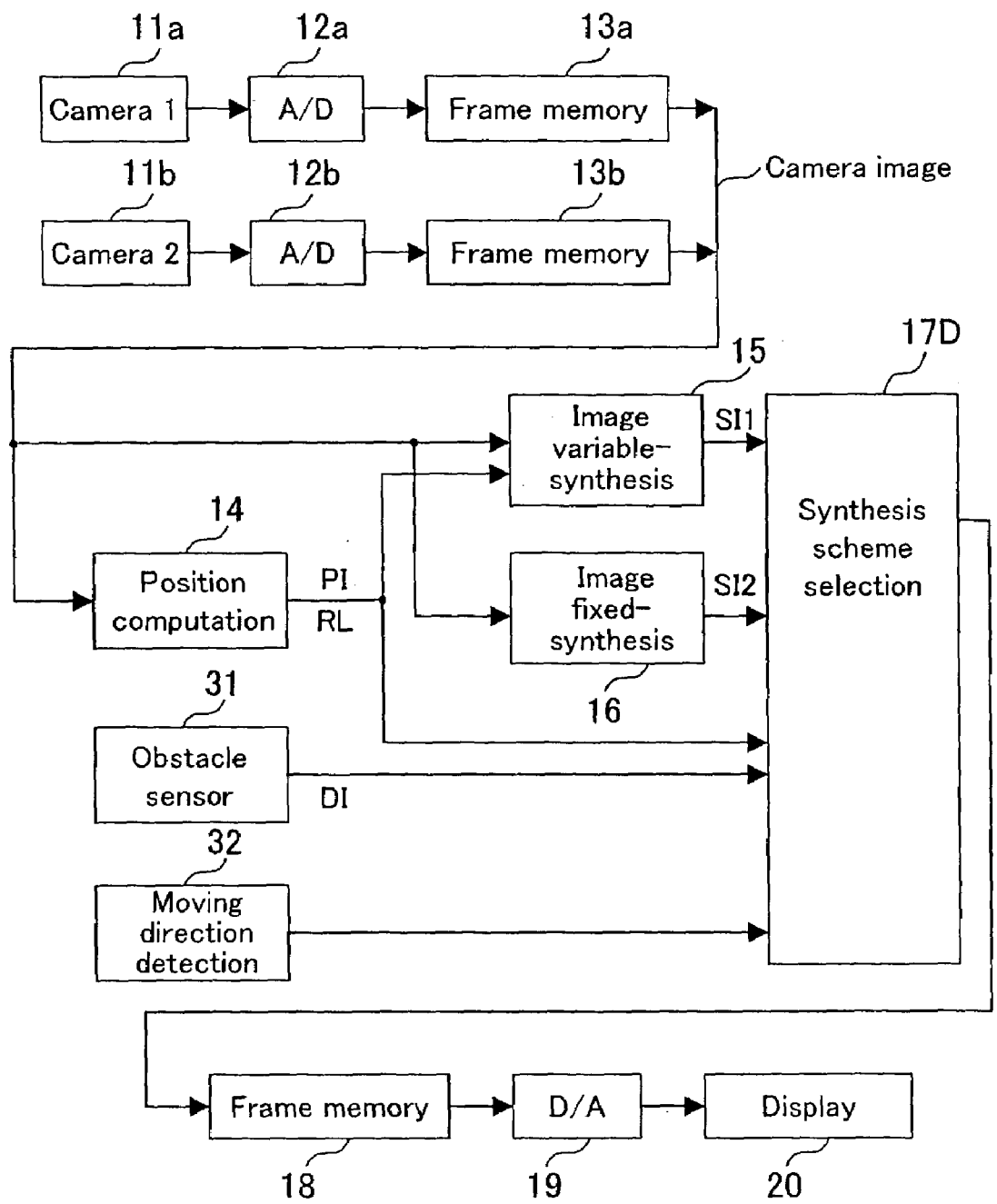
FIG. 15 is a block diagram showing a configuration of a vehicle surroundings monitoring device of Embodiment 5 of the present invention.

FIG. 15 is a block diagram of a vehicle surroundings monitoring device of Embodiment 5 of the present invention. The configuration of FIG. 15 is different from that of FIG. 9 in that the vehicle has a moving direction detection means 32 for detecting the direction of moving of the vehicle, and that a synthesis scheme selection section 17D selects a synthesized image by additional use of moving direction information sent from the moving direction detection means 32. The moving direction detection means 32 may be essentially composed of a car speed sensor, a turning angle sensor and a means for computing the moving direction of the vehicle from the outputs of the car speed sensor and the turning angle sensor. The moving direction detection means having such a configuration is already widely known, and thus detailed description thereof is omitted here.

Figure 16:
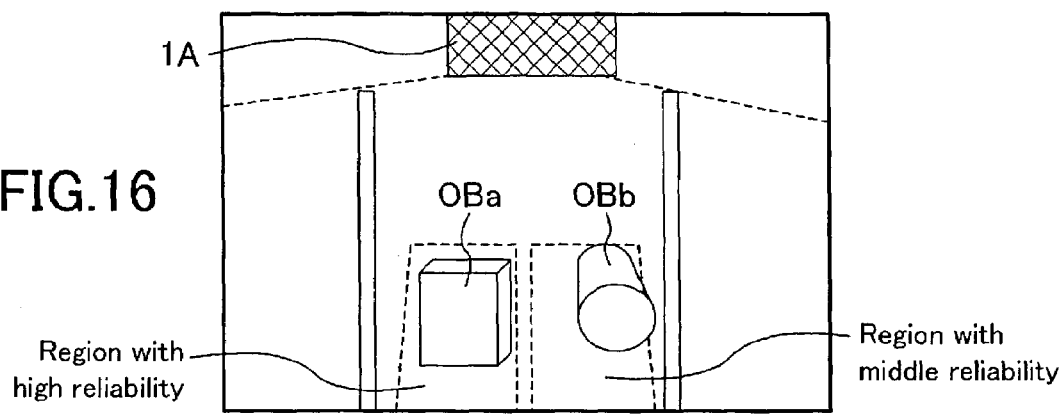
FIG. 16 is an example of a first synthesized image produced by an image variable-synthesis section in Embodiment 5.

Assume that in the situation shown in FIG. 11, the reliability RL of the position information PI computed by the position computation section 14 is high in the region including the obstacle OBa, but is lower in the region including the obstacle OBb compared with that in the region including the obstacle OBa. In this case, the first synthesized image SI1 produced by the image variable-synthesis section 15 is as shown in FIG. 16, in which, while the obstacle OBa is displayed at a correct position because the position information is small in error, the obstacle OBb is displaced a little because the position information includes errors largely.

The synthesis scheme selection section 17D specifies a point corresponding to a region of the image located in the moving direction of the vehicle among the plurality of points specified by the position computation section 14, and selects a synthesized image according to the reliability of the specified point.

For example, when the vehicle moves backward to the left, that is, moves toward the obstacle OBa, the synthesis scheme selection section 17D selects a synthesized image based on the reliability of a point belonging to the region including the obstacle OBa. Contrarily, when the vehicle moves backward to the right, that is, moves toward the obstacle OBb, the synthesis scheme selection section 17D selects a synthesized image based on the reliability of a point belonging to the region including the obstacle OBb.

Figure 17A:
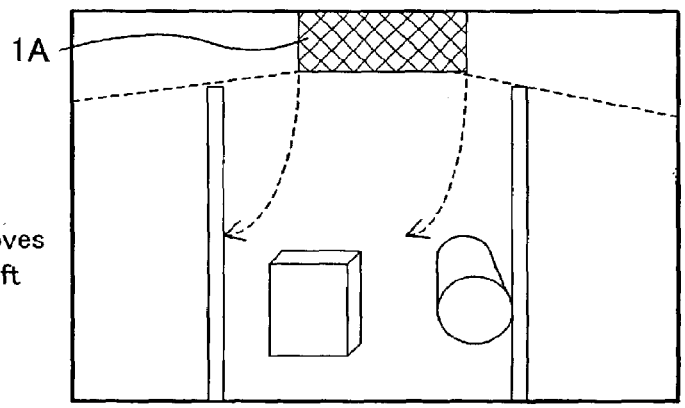
FIGS. 17A and 17B are examples of a synthesized image output from a synthesis scheme selection section in Embodiment 5.
Figure 17B:
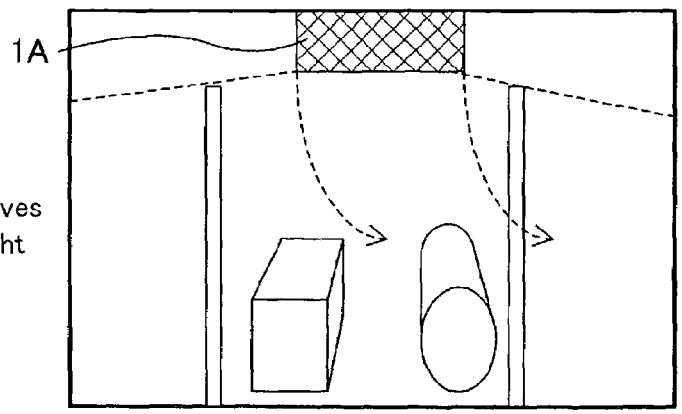

FIG. 17A is an example of a synthesized image output by the synthesis scheme selection section 17D when the vehicle moves backward to the left, in which the first synthesized image SI1 produced by the image variable-synthesis section 15 has been selected because the reliability of a point in the region including the obstacle OBa located in the moving direction of the vehicle is high. FIG. 17B is an example of a synthesized image output by the synthesis scheme selection section 17D when the vehicle moves backward to the right, in which the second synthesized image SI2 produced by the image fixed-synthesis section 16 has been selected because the reliability of a point in the region including the obstacle OBb located in the moving direction of the vehicle is low.

An image of a region located in the moving direction of the vehicle is very important during driving. Therefore, an obstacle existing in a region located in the moving direction of the vehicle should desirably be displayed at a correct position. However, no serious problem will occur if an obstacle existing outside such a region is displayed at a more or less displaced position. The driver may be affected more greatly by a strange feeling against a distorted shape than by a small positional displacement in some cases. In such cases, a more suitable synthesized image can be presented in this embodiment.

As described above, in this embodiment, the moving direction of the vehicle is additionally used for the selection of a synthesized image, in which the reliability of a point in a region located in the moving direction of the vehicle is used. Therefore, it is possible to present such a synthesized image that an obstacle will not be shown at a wrong position in a region located in the moving direction of the vehicle and little distortion is included in the other region.

In this embodiment, hysteresis may be given to the threshold used as the reference for selection of a synthesized image, and the width of the hysteresis may be changed with the moving speed of the vehicle. Specifically, the width of the hysteresis may be made greater with increase of the moving speed of the vehicle. In general, as the moving speed of the vehicle is higher, the change of the image with time is greater, and thus the change of the reliability with time is greater. Therefore, by increasing the width of the hysteresis with increase of the moving speed, frequent switching of the synthesized image can be suppressed, and thus the driver will find less difficulty in grasping the situation around the vehicle.

Note that the cameras, the display, the A/D converters, the D/A converter, the frame memories, the obstacle sensor and the moving direction detection means are not necessarily requisite components of the vehicle surroundings monitoring device of the present invention.

Figure 18:
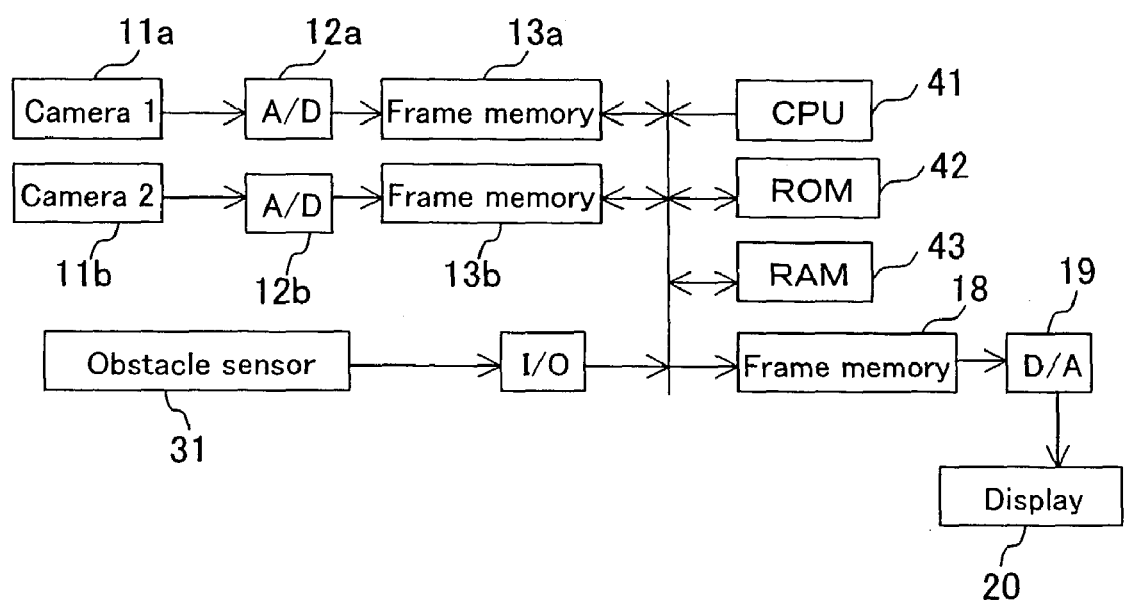
FIG. 18 is a block diagram of a vehicle surroundings monitoring device of the present invention, configured using a computer.

In the embodiments described above, the processing means according to the present invention, that is, the position computation section, the image variable-synthesis section, the image fixed-synthesis section and the synthesis scheme selection section were respectively implemented by hardware. Alternatively, these means may be implemented by software. In software implementation, the vehicle surroundings monitoring device of the present invention is configured of a computer including a CPU 41, a ROM 42 and a RAM 43 as shown in FIG. 18, for example. The processing means such as the position computation section, the image variable-synthesis section, the image fixed-synthesis section and the synthesis scheme selection section are implemented by executing a program stored in the ROM 42 or the RAM 43 with the CPU 41.

Figure 19:
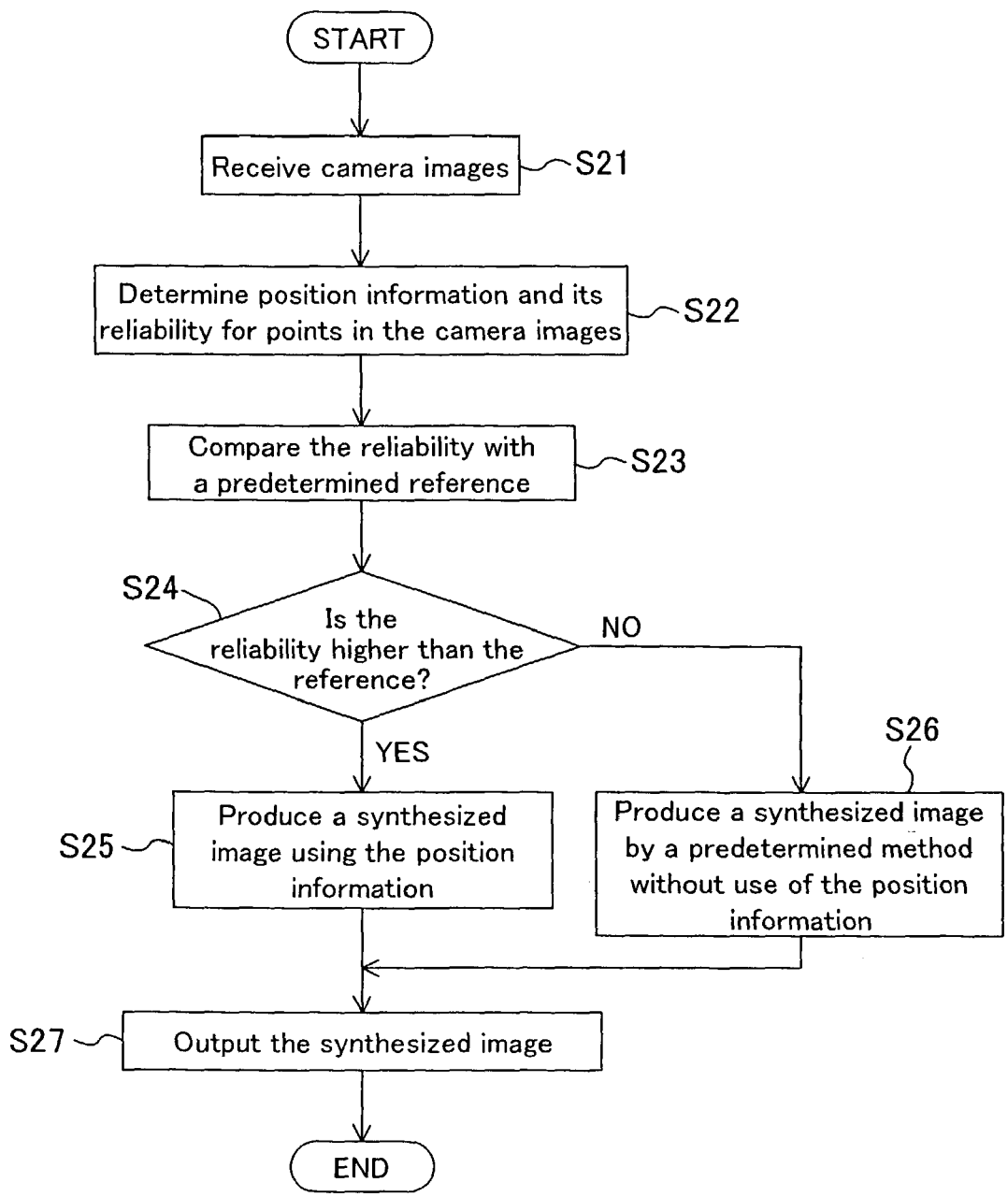
FIG. 19 is a flowchart showing a flow of processing followed by the configuration of FIG. 18.
Figure 20A:
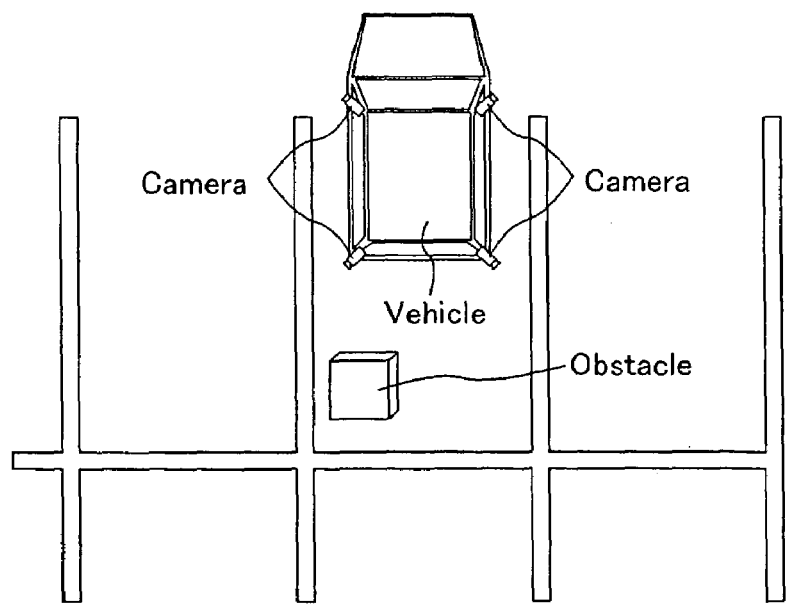
FIGS. 20A and 20B are views showing a conventional technique.
Figure 20B:
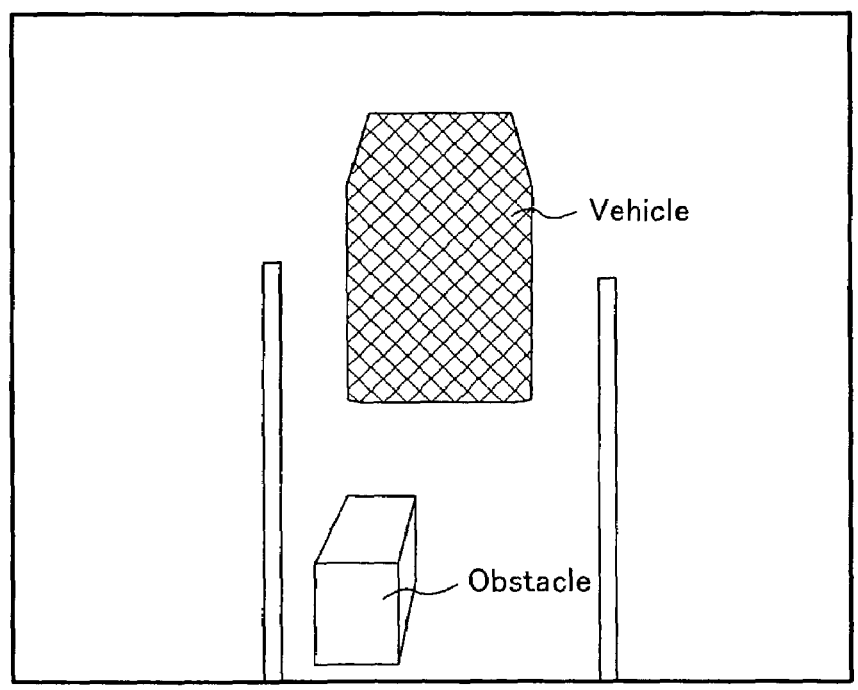
Figure 21A:
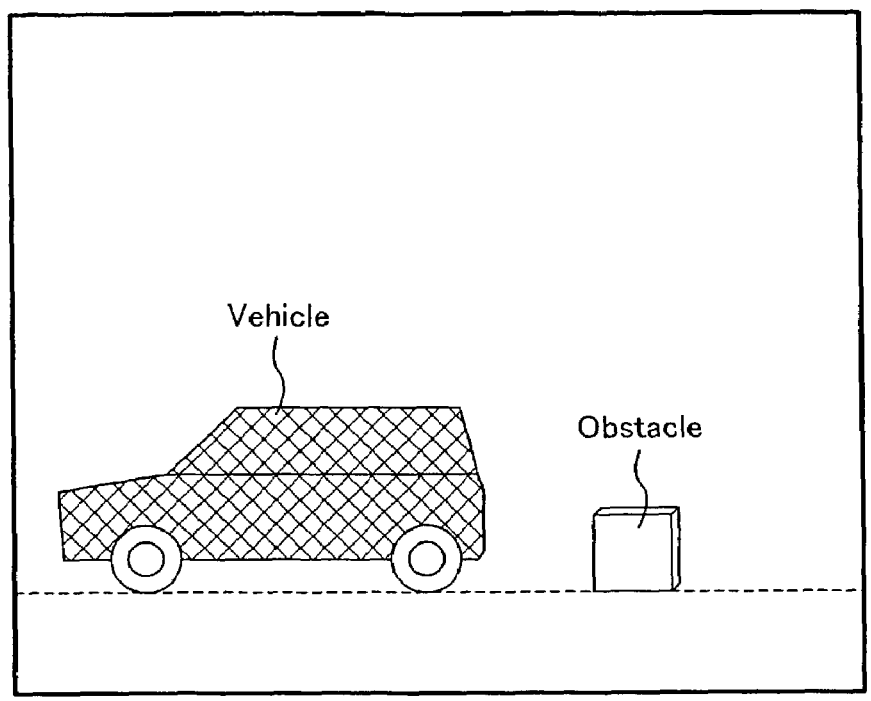
FIGS. 21A and 21B are views showing another conventional technique together with its problem.
Figure 21B:
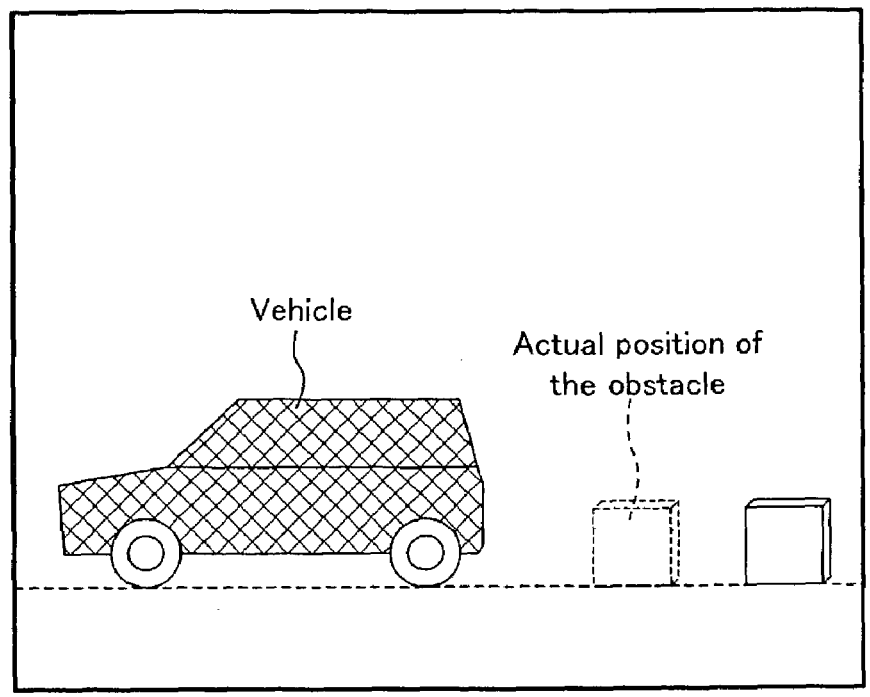

FIG. 19 is a flowchart showing an example of flow of processing followed by the configuration of FIG. 18, which corresponds to the image production method and the image production program according to the present invention. First, camera images are received from the frame memories 13a and 13b (S21). Position information and the reliability thereof are determined for a plurality of points from the received camera images as in the operation of the position computation section 14 described above (S22). The reliability is compared with a predetermined reference as described in Embodiment 1 (S23). If the reliability is higher than the predetermined reference (Yes in S24), a synthesized image is produced from the camera images using the position information, as in the operation of the image variable-synthesis section 15 (S25). If the reliability is lower than the predetermined reference (No in S24), a synthesized image is produced from the camera images by a predetermined method without use of the position information, as in the operation of the image fixed-synthesis section 16 (S26). The produced synthesized image is then output to the frame memory 18 (S27).

In the method shown in FIG. 19, a synthesized image was selectively produced according to the reliability. Naturally, as in the embodiments described above, two types of synthesized images may be produced first, and then either one of them may be selected according to the reliability. In reverse, in the hard configuration shown in FIG. 1, for example, the synthesis scheme selection section 17 may selectively put either one of the image variable-synthesis section 15 and the image fixed-synthesis section 16 into operation according to the reliability.

The present invention may be applied, not only to monitoring of the surroundings of a vehicle, but also to robots, for example. For example, a remote-controllable mobile robot may be provided with a camera and the monitoring device of the present invention. A synthesized image showing the situation around the robot may be displayed on a remote display to enable monitoring by the user of the robot. In this case, also, the effect described in the embodiments of the present invention can be obtained.

Thus, according to the present invention, as an image showing the situation around a vehicle, a synthesized image with little distortion is displayed when the position information has been computed correctly. When the position information includes errors greatly, a synthesized image free from an obstacle being displayed at a wrong position or an obstacle disappearing is displayed. Therefore, a more natural and safer image can be presented.

While the present invention has been described in preferred embodiments, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A vehicle surroundings monitoring device for producing a synthesized image showing the situation around a vehicle using images taken with at least one camera capturing the surroundings of the vehicle and presenting the synthesized image at a display unit, the device comprising:
   a position computation section operable to compute position information for a plurality of points in the images taken with the at least one camera, and operable to compute a precision of the position information, wherein said precision represents a degree of a measurement error;
   an image variable-synthesis section operable to produce a first synthesized image having a predetermined view-point which is different form a view point of the camera, based on the images taken with the at least one camera and the position information;
   an image fixed-synthesis section operable to produce a second synthesized image having a predetermined view point which is different from a view point of the camera, based on the images taken with the at least one camera by a predetermined method without use of the position information; and
   a synthesis scheme selection section operable to select either the first synthesized image or the second synthesized image based on the precision as the synthesized image to be presented at the display unit.

2. The device of claim 1, wherein the synthesis scheme selection section selects a synthesized image by additional use of the position information.

3. The device of claim 2, wherein the synthesis scheme selection section extracts a point belonging to a region used for image synthesis among the plurality of points by referring to the position information, and
   the precision of the extracted point is used for selection of a synthesized image.

4. The device of claim 1, wherein the image variable-synthesis section and the image fixed-synthesis section perform image synthesis so that the first and second synthesized images match with each other in the position of the road surface.

5. The device of claim 1, wherein the synthesis scheme selection section selects image parts from the first and second synthesized images according to the precision, in place of selecting either one of the first and second synthesized images, and produces the synthesized image to be presented from the selected image parts.

6. the device of claim 1, wherein the synthesis scheme selection section superimposes on the selected synthesized image a predetermined indication corresponding to a feature of the synthesized image.

7. The device of claim 1, wherein the vehicle is provided with an obstacle sensor, and
   the synthesis scheme selection section selects a synthesized image by additional use of distance information indicating a distance value from an obstacle obtained from the obstacle sensor.

8. The device of claim 7, wherein the synthesis scheme selection section evaluates the accuracy of the position information of the obstacle by referring to the distance information and the position information, and when determining that the accuracy is insufficient, does not select a synthesized image according to the precision, but selects the second synthesized image.

9. The device of claim 1, wherein the vehicle is provided with moving direction detection means for detecting the moving direction of the vehicle, and
   the synthesis scheme selection section selects a synthesized image by additional use of the moving direction obtained from the moving direction detection means.

10. The device of claim 9, wherein the synthesis scheme selection specifies a point belonging to an image region located in the moving direction among the plurality of points, and
   the precision of the specified point is used for selection of a synthesized image.

11. A vehicle surroundings monitoring device according to claim 1, wherein the position computation section computes the precision by which position information is calculated, including determining a degree at which computed position information includes errors.

12. An image production method for producing a synthesized image showing the situation around a vehicle using images taken with at least one camera capturing the surroundings of the vehicle, the method comprising:

computing position information for a plurality of points in the images taken with the at least one camera, and precision of the position information, wherein said precision represents a degree of a measurement error;

comparing the precision with a predetermined reference;

producing a first synthesized image viewed from a predetermined viewpoint which is different from a viewpoint of the at least one camera, based on the images taken with the at least one camera and position information if the precision is determined higher than the predetermined reference; and producing a second synthesized image viewed from a predetermined viewpoint which is different from a viewpoint of the at least one camera, based on the images taken with the at least one camera by a predetermined method without use of the position information if the precision is determined lower than the predetermined reference.

13. The method of claim 12, wherein the step (1) comprises:

tracking a corresponding point in first and second camera images;

computing three-dimensional position coordinates of the specified corresponding point from original image coordinates of the point in the first and second camera images, and determining the original image coordinates and the three-dimensional position coordinates as the position information of the corresponding point;

inversely computing image coordinates of the corresponding point in the first and second camera images from the three-dimensional position coordinates; and determining the precision of the position information using the inversely-computed image coordinates and the original image coordinates.

14. A program enabling a computer to execute a method for producing a synthesized image showing the situation around a vehicle from images taken with a camera capturing the surroundings of the vehicle, the method comprising the steps of:

(1) computing position information and precision of the position information, for a plurality of points in the camera images;

(2) comparing the precision computed in the step (1) with a predetermined reference;

(3) producing the synthesized image viewed from a predetermined viewpoint using the camera images and the position information computed in the step (1) if the precision is determined higher than the predetermined reference in the step (2); and (4) producing the synthesized image from the camera images by a predetermined method without use of the position information if the precision is determined lower than the predetermined reference in the step (2).

15. A vehicle surroundings monitoring device for producing a synthesized image showing the situation around a vehicle, said the device comprising:

at least one camera operable to capture the surroundings of the vehicle;

a position computation section operable to compute position information for a plurality of points in images taken with the at least one camera, and operable to compute a measurement error for the position information;

an image variable-synthesis section operable to produce a first synthesized image having a predetermined view point which is different from a view point at which the images were captured by the camera, based on the images taken with the at least one camera and position information;

an image fixed-synthesis section operable to produce a second synthesized image having a predetermined view point which is different from a view point at which the images were captured by the camera, based on the images taken with the at least one camera by a predetermined method without use of the position information;

a synthesis scheme section operable to select as the synthesized image either the first synthesized image or the second synthesized image based on the measurement error of the position information; and a display unit operable to display the synthesized image.

* * * * *

UNITED STATES PATENT AND TRADEMARK OFFICE
CERTIFICATE OF CORRECTION

PATENT NO. : 7,110,021 B2  Page 1 of 1
APPLICATION NO. : 10/447523
DATED : September 19, 2006
INVENTOR(S) : Kunio Nobori et al.

It is certified that error appears in the above-identified patent and that said Letters Patent is hereby corrected as shown below:

On the title page:

Item (75) Inventors, "Kunio Nobori, Kadoma, (JP)" should be -- Kunio Nobori, Osaka (JP) --

Item (75) Inventors, "Masamichi Nakagawa, Hirakata (JP)" should be -- Masamichi Nakagawa, Osaka (JP) --

Item (75) Inventors, "Satoshi Sato, Neyagawa (JP)" should be -- Satoshi Sato, Osaka, (JP) --

In the Claims:

Column 18, Line 1, Claim 1 "form" should be -- from --

Column 19, Line 39, Claim 14 "A program enabling a computer . . ." should be --A computer program embedded in a computer readable medium enabling a computer to . . . --

Signed and Sealed this

Twentieth Day of March, 2007

JON W. DUDAS
*Director of the United States Patent and Trademark Office*